(12) United States Patent
Wallstrom

(10) Patent No.: US 12,486,408 B2
(45) Date of Patent: *Dec. 2, 2025

(54) USE OF BIOCIDAL AEROGEL COMPOSITIONS IN ON-SHORE PAINTS, COATINGS AND SEALANTS

(71) Applicant: Aerogel ApS, Copenhagen (DK)

(72) Inventor: Eva Wallstrom, Copenhagen (DK)

(73) Assignee: Aerogel ApS, Copenhagen (DK)

( * ) Notice: Subject to any disclaimer, the term of this patent is extended or adjusted under 35 U.S.C. 154(b) by 621 days.

This patent is subject to a terminal disclaimer.

(21) Appl. No.: 17/789,475

(22) PCT Filed: Dec. 23, 2020

(86) PCT No.: PCT/EP2020/087731
§ 371 (c)(1),
(2) Date: Jun. 27, 2022

(87) PCT Pub. No.: WO2021/130289
PCT Pub. Date: Jul. 1, 2021

(65) Prior Publication Data
US 2024/0018367 A1    Jan. 18, 2024

(30) Foreign Application Priority Data

Dec. 27, 2019   (EP) .................................. 19219783

(51) Int. Cl.
| | | |
|---|---|---|
| *C09D 7/61* | (2018.01) | |
| *A01N 25/04* | (2006.01) | |
| *A01N 41/06* | (2006.01) | |
| *A01N 43/40* | (2006.01) | |
| *A01N 43/70* | (2006.01) | |
| *A01N 47/10* | (2006.01) | |
| *A01N 47/12* | (2006.01) | |
| *A01N 47/30* | (2006.01) | |
| *A01N 59/16* | (2006.01) | |
| *C08K 5/56* | (2006.01) | |
| *C08K 9/10* | (2006.01) | |
| *C09D 5/14* | (2006.01) | |
| *C09D 5/16* | (2006.01) | |
| *C09D 7/63* | (2018.01) | |

(52) U.S. Cl.
CPC .......... *C09D 5/1687* (2013.01); *A01N 25/04* (2013.01); *A01N 41/06* (2013.01); *A01N 43/40* (2013.01); *A01N 43/70* (2013.01); *A01N 47/10* (2013.01); *A01N 47/12* (2013.01); *A01N 47/30* (2013.01); *A01N 59/16* (2013.01); *C08K 5/56* (2013.01); *C08K 9/10* (2013.01); *C09D 5/14* (2013.01); *C09D 5/1618* (2013.01); *C09D 5/1625* (2013.01); *C09D 7/61* (2018.01); *C09D 7/63* (2018.01)

(58) Field of Classification Search
CPC ...... C09D 5/1687; C09D 5/14; C09D 5/1618; C09D 5/1625; C09D 7/61; C09D 7/63; C09D 7/40; C09D 5/1606; A01N 25/04; A01N 41/06; A01N 43/40; A01N 43/70; A01N 47/10; A01N 47/12; A01N 47/30; A01N 59/16; A01N 25/16; A01N 25/26; A01N 25/08; A01N 59/20; C08K 5/56; C08K 9/10; C08K 3/36; B05D 7/06; B27K 3/52

See application file for complete search history.

(56) References Cited

U.S. PATENT DOCUMENTS

| | | |
|---|---|---|
| 5,298,061 A | 3/1994 | Waldron et al. |
| 9,155,298 B2 | 10/2015 | Tofte Jespersen |
| 10,446,920 B1 | 10/2019 | Meador et al. |
| 12,245,592 B2 | 3/2025 | Wallstrom |
| 2010/0239679 A1 | 9/2010 | Greene et al. |
| 2010/0269731 A1 | 10/2010 | Tofte Jespersen et al. |
| 2011/0056408 A1 | 3/2011 | Schaumburg et al. |
| 2011/0105636 A1 | 5/2011 | Kim et al. |
| 2012/0312192 A1 | 12/2012 | Detty et al. |
| 2013/0145957 A1 | 6/2013 | Shchukin et al. |
| 2013/0209389 A1 | 8/2013 | Tofte |
| 2013/0245155 A1 | 9/2013 | Van Loon et al. |
| 2014/0242403 A1 | 8/2014 | Olsen et al. |
| 2018/0339491 A1 | 11/2018 | Hursit et al. |
| 2019/0143290 A1 | 5/2019 | Bertino et al. |
| 2021/0368804 A1 | 12/2021 | Wallstrom |
| 2022/0079162 A1 | 3/2022 | Wallstrom |

(Continued)

FOREIGN PATENT DOCUMENTS

| | | |
|---|---|---|
| CN | 1232610 A | 10/1999 |
| CN | 102137900 A | 7/2011 |

(Continued)

OTHER PUBLICATIONS

[No. Author Listed], "Reducing the barnacle bill," The Economist, Sep. 3, 2011, 400(8749), 2 pages.

(Continued)

*Primary Examiner* — Anthony J Green

(74) *Attorney, Agent, or Firm* — Fish & Richardson P.C.

(57) ABSTRACT

The present invention relates to silica aerogels with a high to very high loading (55-90% w/w) of encapsulated biocidal and/or biorepellant compounds and very low thermal conductivity and to methods of making and using such aerogels in anti-fouling compositions, which are especially suitable for coatings (marine paints, coatings, sealants, lacquers, wood protection or similar controlled leaching systems) that are naturally exposed to humid conditions and/or water, including sea water, and thus prone to fouling.

9 Claims, 10 Drawing Sheets

(56) References Cited

U.S. PATENT DOCUMENTS

Figure 4:
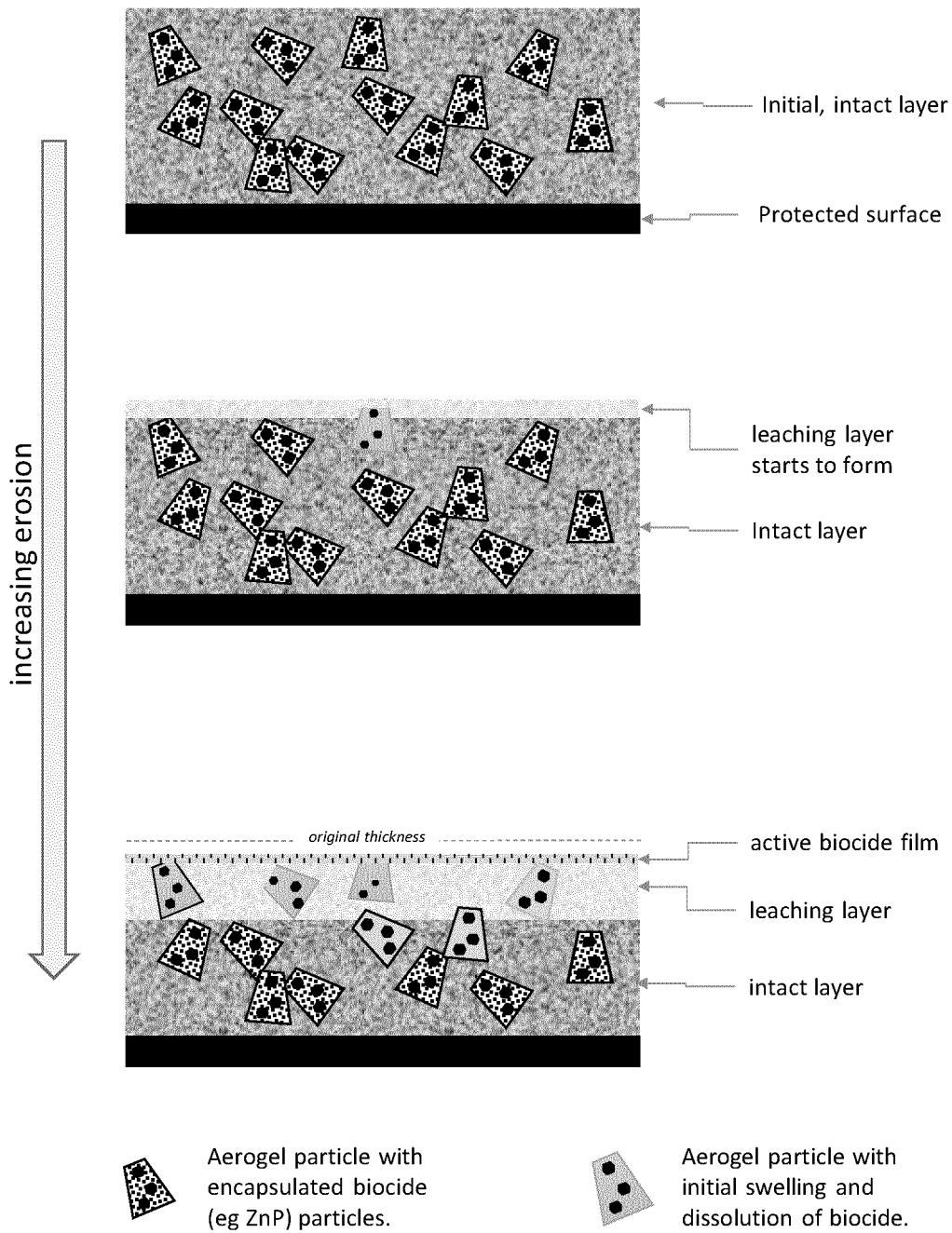
Figure 6:
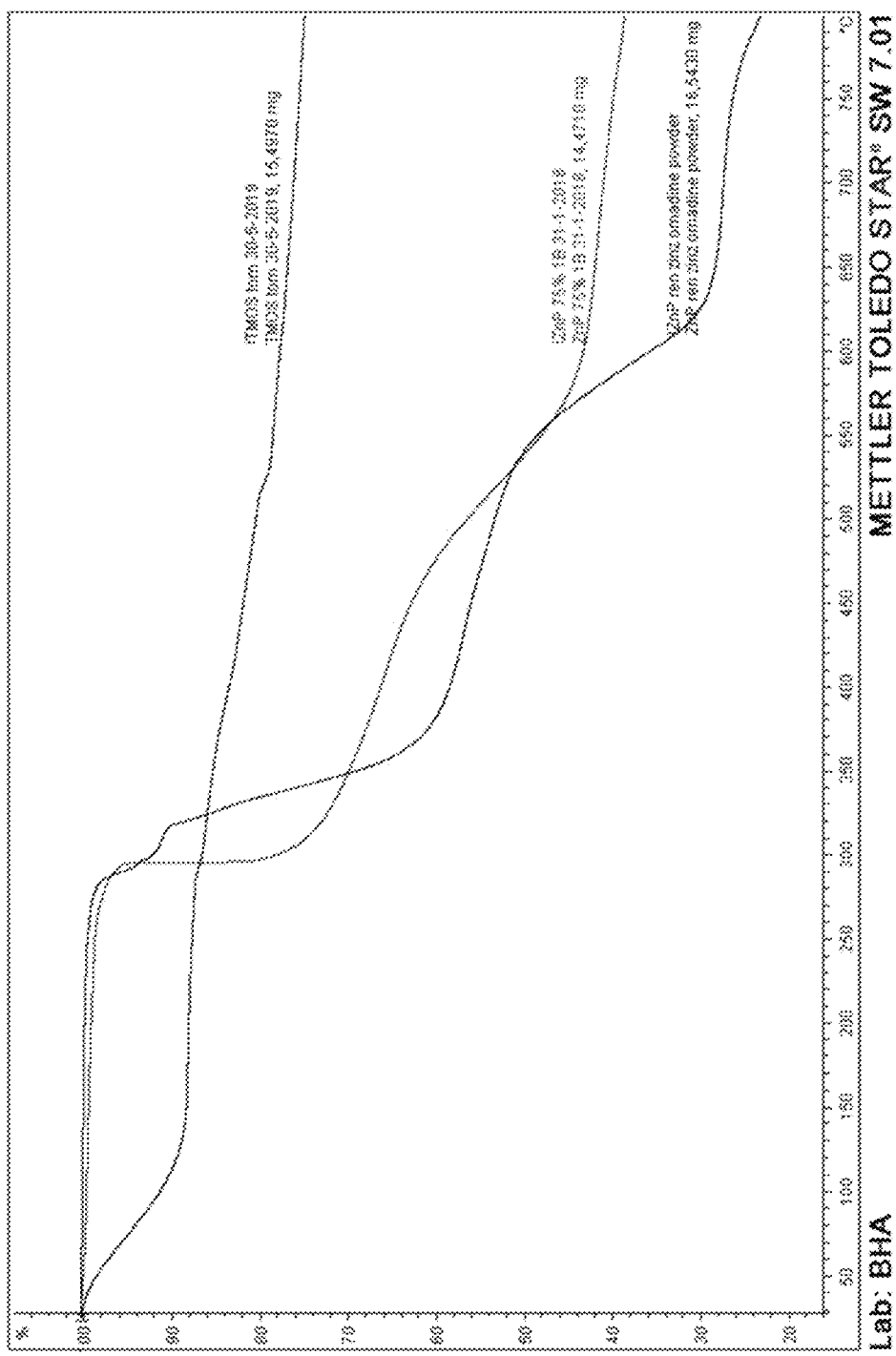

| | | |
|---|---|---|
| 2023/0048340 A1 | 2/2023 | Wallstrom |
| 2023/0072791 A1 | 3/2023 | Wallstrom |
| 2024/0270982 A1 | 8/2024 | Wallstrom |

FOREIGN PATENT DOCUMENTS

| | | |
|---|---|---|
| CN | 102575205 A | 7/2012 |
| CN | 102816469 A | 12/2012 |
| CN | 103189454 A | 7/2013 |
| CN | 103857754 A | 6/2014 |
| CN | 106102895 A | 11/2016 |
| CN | 106459468 A | 2/2017 |
| CN | 107266996 A | 10/2017 |
| CN | 107406329 A | 11/2017 |
| CN | 107793083 A | 3/2018 |
| CN | 107849764 A | 3/2018 |
| CN | 111096317 A | 5/2020 |
| EP | 2130877 A1 | 12/2009 |
| FR | 2968666 A | 6/2012 |
| IN | 419240 B | 1/2023 |
| JP | H01-266171 A | 10/1989 |
| JP | H11-513431 A | 11/1999 |
| JP | 2002-338405 A | 11/2002 |
| JP | 2006-213783 A | 8/2006 |
| JP | 2009-507128 A | 2/2009 |
| JP | 2011-503302 A | 1/2011 |
| JP | 2013-521365 A | 6/2013 |
| JP | 2016-519179 A | 6/2016 |
| JP | 2019-535868 A | 12/2019 |
| JP | 2021-529866 A | 11/2021 |
| SE | 0901216 A1 | 2/2011 |
| WO | WO 2009/062975 | 5/2009 |
| WO | WO 2009062518 A1 | 5/2009 |
| WO | WO 2017010459 A1 | 1/2017 |
| WO | WO 2019033199 A1 | 2/2019 |
| WO | WO 2019189412 A1 | 10/2019 |
| WO | WO 2020/002659 | 1/2020 |

OTHER PUBLICATIONS

Bressy et al., "Tin-free self-polishing marine antifouling coatings," Advances in Marine Antifouling Coatings and Technologies, 2009, pp. 445-491.

He et al., "Thermal Conductivity of Silica Aerogel Thermal Insulation Coatings," Int J Thermophys, Oct. 2019, 40(10):92, 12 pages.

International Preliminary Report on Patentability Chapter II in International Appln. No. PCT/EP2020/087729, dated Mar. 24, 2022, 8 pages.

International Preliminary Report on Patentability Chapter II in International Appln. No. PCT/EP2020/087730, dated Mar. 24, 2022, 8 pages.

International Preliminary Report on Patentability Chapter II in International Appln. No. PCT/EP2020/087731, dated Mar. 24, 2022, 8 pages.

International Search Report and Written Opinion in International Appln. No. PCT/EP2020/087729, dated Mar. 30, 2021, 12 pages.

International Search Report and Written Opinion in International Appln. No. PCT/EP2020/087730, dated Mar. 31, 2021, 14 pages.

International Search Report and Written Opinion in International Appln. No. PCT/EP2020/087731, dated Mar. 29, 2021, 13 pages.

Jämsä et al., "Slow release of a biocidal agent from polymeric microcapsules for preventing biodeterioration," Progress in Organic Coatings, Jan. 2013, 76(1):269-276.

Kamtsikakis et al., "Encapsulation of Antifouling Organic Biocides in Poly(lactic acid) Nanoparticles," Bioengineering, 2017, 4(4):81, 18 pages.

Kistler, "Coherent Expanded Aerogels," J. Phys. Chem., 1932, 36(1):52-64.

Wallström et al., "A new concept for anti-fouling paint for Yachts," Prog. Org. Coat., 2011, 72(1-2):109-114.

Wallström et al., "Lystbådmaling med minimeret biocidindhold. Miljøprojekt nr. 1663," Danish Ministry of Environment, DK, 2015, 66 pages (with English summary).

Yao et al., "Orthogonal optimization design of SiO2 aerogel preparation conditions and its thermophysical properties," Aerospace Materials and Technology, 2009, 39(1):32-34 (Abstract with machine English translation).

Almond et al., "The effects of copper pyrithione, an antifouling agent, on developing zebrafish embryos," Ecotoxicology, 2016, 25(2):389-398.

CAS No. 122454-29-9, "Tralopyril," retrieved on Mar. 4, 2024, retrieved from URL<https://echa.europa.eu/substance-information/-/substanceinfo/100.125.440>, 3 pages.

Economist.com [online], "Reducing the barnacle bill," The Economist Technology Quarterly Q3 2011, Sep. 3, 2011, Retrieved on Mar. 4, 2023, retrieved from URL<https://www.economist.com/technology-quarterly/2011/09/03/reducing-the-barnacle-bill>, 4 pages.

European Search Report in EP Appln. No. 18180787.6, dated Oct. 8, 2018, 9 pages.

Extended European Search Report in European Appln. No. 21169564.8, mailed on Nov. 2, 2021, 7 pages.

PCT International Preliminary Report on Patentability in International Appln. No. PCT/EP2019/067445, dated Dec. 29, 2020, 6 pages.

PCT International Search Report and Written Opinion in International Appln. No. PCT/EP2019/067445, dated Sep. 24, 2019, 9 pages.

Wallstroem et al., "Yacht paint with minimised biocide content", Report in Danish from the Danish Ministry of Environment, Environmental Project No. 1663, 2015, 134 pages (with Machine English translation).

Xiao et al., "Research progress on green antifouling on hull surface based on low surface energy design," Ship Engineering, 2017, 39(3):25-30 (Abstract with English translation).

Yachtingmonthly.com [online], "What happens when they ban antifoul?," Feb. 4, 2016, retrieved on Mar. 4, 2024, retrieved from URL<https://www.yachtingmonthly.com/gear/what-happens-when-they-ban-antifoul-34343>, 15 pages.

Yu et al., "Biomimetic transparent and superhydrophobic coatings: from nature and beyond nature," Chemical Communications, Feb. 2015, 51(10): 1775-1794.

FIGURE 1
Initial surface of coating or sealant
Increasing erosion
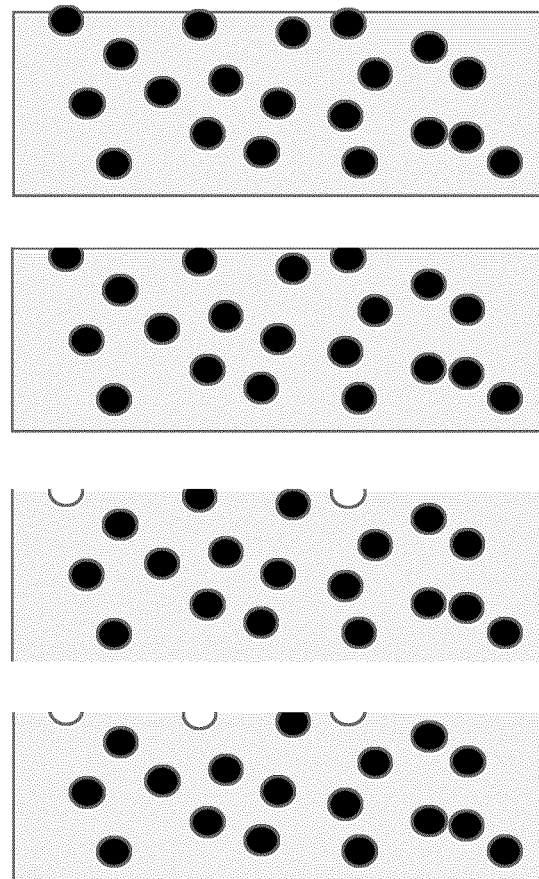
 Biocide (e.g. ZnP) particles

FIGURE 2

Biocide content in wet paint (w%) as a function of biocide loading in aerogel (w%)
silica limit = 1.5%

FIGURE 3

FIGURE 5

| Active substance | EC no. | CAS no. | Density g/cm3 | Solubility in water, 20°C [g/L] |
|---|---|---|---|---|
| Tolylfluanid | 211-986-9 | 731-27-1 | 1,52 | 0,9 |
| Dichlofluanid | 214-118-7 | 1085-98-9 | 1,55 | 1.3 mg/l |
| Didecylsalt N,N-Didecyl-N,N-dimethyl ammonium carbonate and -bicarbonate | 604-650-1 | 894406-76-9 | 0,947 | 796 |
| Zinc pyrithione | 236-671-3 | 13463-41-7 | 1,78 | 8,0 mg/ml |
| Copper pyrithione | 238-984-0 | 14915-37-8 | 1,82 | <1 mg/ml |
| Diuron | 206-354-4 | 330-54-1 | 1,48 | 29,0 mg/ml |
| DCOIT= 4,5-Dichloro-2-octyl-4-isothiazolin-3-one (=Sea-Nine) | 264-843-8 | 64359-81-5 | 1,28 | 3,47 mg/ml |
| 2-thiazol-4-yl-1H-benzoimidazole (Thiabendazole) | 205-725-8 | 148-79-8 | 1,4 | 31,0 mg/ml |
| IPBC=3-iod-2-propynylbutylcarbamate | 259-627-5 | 55406-53-6 | 1,71 | 168,0 mg/ml |
| Tralopyril= 2-(p-chlorophenyl)-3-cyano-4-bromo-5-trifluoromethyl pyrrole= Econea | 602-784-5 | 122454-29-9 | 1,714 | 0.17 mg/ml |
| Zinc ethylenebisthiocarbamate (= Zineb) | 006-078-00-2 | 12122-67-7 | 1,74 | Insoluble |
| Copper thiocyanate | 214-183-1 | 1111-67-7 | 2,88 | $8.427 \cdot 10^{-7}$ |
| 2-tert-butylamino-4-ethylamino-6-methylthio-1,3,5-triazine (Terbutryn) | 212-950-5 | 886-50-0 | 1.12 | 22 mg/l |

FIGURE 7

| Gel | Proces conditions | Batch | Measured amount biocide by TGA w/w% | Porosity (%) | Bulk density (gr/ml) | App. Density (g/ml) | Intrusion vol ml/g | Oil no. | Specific Surface Area (m2/g) |
|---|---|---|---|---|---|---|---|---|---|
| ZnP, 75% | Normal silicate, intense blending, gelling time 14 min. | 1A | 78 | 63,21 | 0,580 | 1,576 | 1,09 | 104,7 | |
| ZnP, 75% | Normal silicate, ordinary blending, gelling time 14 min. | 1B | 75 | 64,94 | 0,644 | 1,325 | 1,40 | 73,4 | 169,6 |
| ZnP, 75% | Normal silicate, ordinary blending, reduced amt. of ammonia, gelling time 30 min. | 1C | 78 | 62,62 | 0,533 | 1,426 | 1,17 | 66,8 | N.A. |
| ZnP, 75% | Pre-condensated TMOS + reduced amt. of ammonia | 2A | 79 | 66,38 | 0,383 | 1,140 | 1,73 | 77,0 | 152,1 |
| ZnP, 75% | Pre-condensated TMOS + normal amt. of ammonia | 2B | 77 | 67,59 | 0,396 | 1,223 | 1,71 | 70,0 | 162,3 |
| CuP, 75 w/w% | Normal silicate, ordinary blending | 3A | 75 | 66,20 | 0,352 | 1,040 | 3,20 | 68,0 | 155,90 |
| CuP, 75 w/w% | Pre-condensated TMOS | 3B | 76 | 63,90 | 0,485 | 1,380 | 2,39 | 62,4 | 175,75 |
| CuP, 75 w/w% | Pre-condensated TMOS, process scaled up | 3C | 77 | 64,90 | 0,416 | 1,180 | 2,61 | 64,8 | tbd |
| CuP, 75 w/w% | Pre-condensated TEOS | 3D | 76 | 69,80 | 0,335 | 1,110 | 3,43 | 69,9 | tbd |

FIGURE 8

| Ref. | Sample | Drying | Total Porosity [%] | Bulk density at 14.5 [psia] | Apparent Density at 30000 psia [g/mL] | Medium Pore Diameter LP [μm] | Medium Pore Diameter HP [nm] | Total intrusion volume [mL/g] |
|---|---|---|---|---|---|---|---|---|
| D1 | Precondensated TEOS + MTMS w/o biocide (empty gel) | Freeze-drying; Freezing temp. -80°C | 29.4 | 0.857 | 1.214 | 42.0 | 10.5 | 1.22 |
| D2 | Precondensated TEOS + MTMS w/o biocide (empty gel) | Freeze-drying; Freezing temp. -18°C | 27.5 | 0.970 | 1.34 | 45.9 | 10.5 | 1.13 |
| D3 | Precondensated TEOS + MTMS + Diuron 65% | Freeze-drying; Freezing temp. -80°C | 38.9 | 0.867 | 1.420 | 16.3 | 10.9 | 1.29 |
| D4 | Precondensated TEOS + MTMS + Diuron 65% | Freeze-drying; Freezing temp. -18°C | 37.1 | 0.920 | 1.46 | 15.2 | 10.5 | 1.16 |
| D5 | Precondensated TEOS + MTMS + Diuron 65% | Supercritical drying | 42.5 | 1.02 | 1.78 | 10.4 | 10.1 | 0.709 |

FIGURE 9
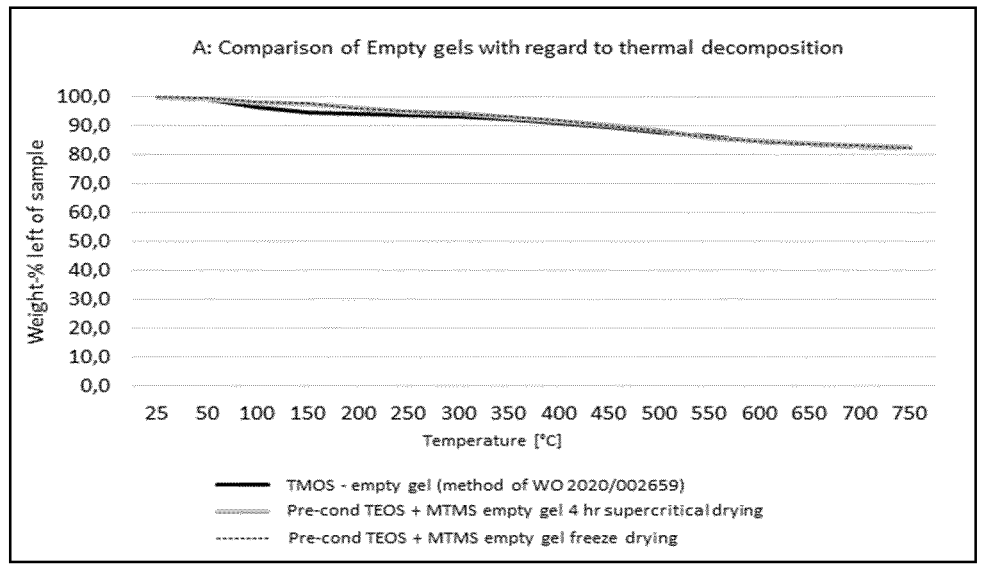
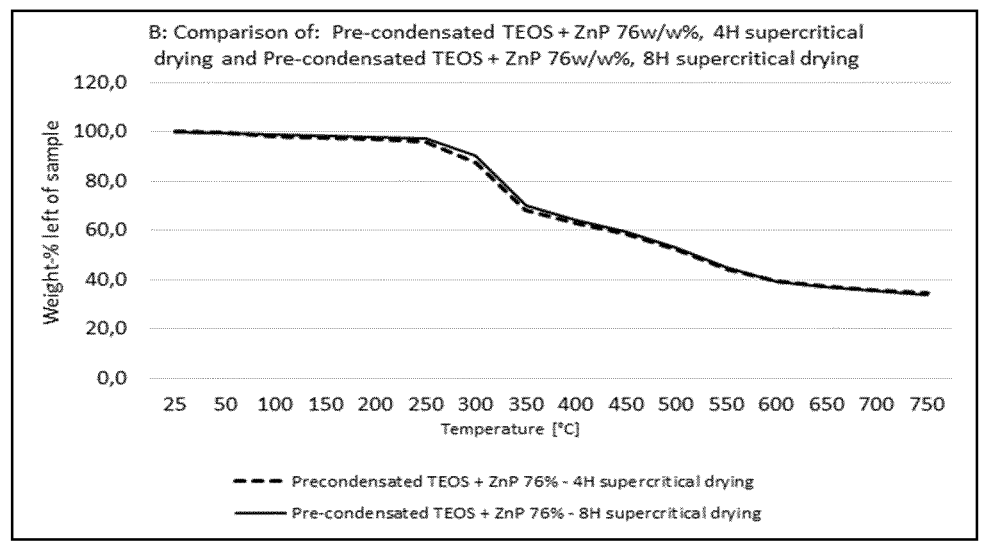
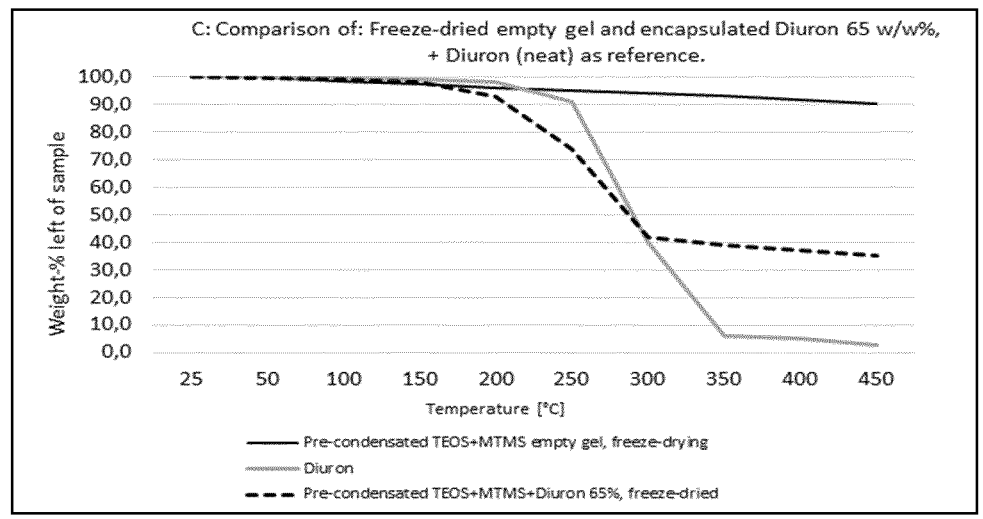

FIGURE 10

| Ref. | Sample | Thermal conductivity [W/m K] | Mean measuring temperature [°C] |
|---|---|---|---|
| TC1 | Gel containing 75% Cu-pyrithione (method of present invention) | 0.0370 (0.0013) | 25.21 (0.18) |
| TC2 | Gel containing 75% Zn-pyrithione (method of present invention) | 0.0312 (0.0021) | 25.36 (0.07) |
| TC3 | Empty gel (method of WO 2020/002659) | 0,0749 (0,0006) | 24.71 (0.07) |

*Figures in brackets are standard deviations.*

Estimated maximum indication error:

- Thermal conductivity: 5% + 0.001 W/m K.

USE OF BIOCIDAL AEROGEL COMPOSITIONS IN ON-SHORE PAINTS, COATINGS AND SEALANTS

CROSS-REFERENCE TO RELATED APPLICATIONS

This application is a U.S. National Phase application under 35 U.S.C. § 371 of International Patent Application No. PCT/EP2020/087731, filed on Dec. 23, 2020, which claims priority to European Patent Application No. 19219783.8, filed on Dec. 27, 2019, the entire contents of which are incorporated herein by reference.

FIELD OF THE INVENTION

The present invention relates to silica aerogels with a high to very high loading (55-90% w/w) of encapsulated biocidal and/or biorepellant compounds and very low thermal conductivity and to methods of making and using such aerogels in anti-fouling compositions, which are especially suitable for coatings (marine paints, coatings, lacquers, wood protection) and sealants that are naturally exposed to humid conditions and/or water including sea water, and thus prone to fouling.

BACKGROUND OF THE INVENTION

Biocides and biorepellants are substances that are used to prevent unwanted growth of biological organisms from marine surfaces (boats, vessels, and buildings, installations including installations submerged in water, or other areas. Biocides and biorepellants are typically added to products such as protective coatings, coatings and lacquers which may be applied to areas susceptible to such unwanted growth, and are also added to elastic sealants such as silicone sealants, which are typically used indoors in areas with regular exposure to high humidity, i.e. "wet rooms" such as kitchens, bathrooms, and toilets.

Protective coatings applied for exterior or interior use typically have two basic functions, protection, and decoration. Elastic sealants are typically used to close joints and cracks between non-elastic surfaces such as ceramic tiles where the function of the sealant is to hide the joint or crack, absorb the settling of the non-elastic surfaces and prevent moisture from entering. Elastic sealants thus also have the basic functions of protection and decoration. Ship surfaces exposed to seawater present a special problem as they are inclined to settlement of microorganisms, plants, algae, and animals, thereby increasing the propulsion resistance of the vessel, and hence reducing speed or increasing fuel consumption. This biological process is termed fouling and can be classified in two broad groups: Microfouling, which includes colonies of unicellular algae and bacteria, often referred to as "slime", and Macrofouling, which includes both plant (weed) and animal fouling. Especially Macrofouling poses problems in relation to propulsion resistance.

The propulsion resistance imposed by a heavy infestation of barnacles may push a ship's fuel consumption up by as much as 40% (The Economist Technology Quarterly Q3 2011, Sep. $3^{rd}$ 2011). Solving the general fouling problem therefore has both a positive financial and environmental impact due to lowered fuel costs and reduced $CO_2$ emissions, but at the same time anti-fouling paints present a problem due to the amounts of biocidal compounds (including heavy metals) which are constantly liberated into the oceans.

Attack of biological organisms such as e.g. fungi and algae—either in the wet state or at the surface of the coating or sealant—can impair both the protection rendered by the coat film or sealant, and its decorative effect. This biological process is termed fouling. Mold and mildew are common fungi types which can attack both indoor and outdoor surfaces, which often become humid. Mold spores can become a serious allergy problem and over time mold and other fungi destroys especially wood-based construction materials, so mold and other types of fouling are important to prevent efficiently.

Fouling of the types mentioned is commonly fought using paints, coatings and sealants which release biocidal compounds that are active on the surface. Biocides are chemical compounds, which are toxic to microbial cells, and thereby prevent the growth of unwanted micro and macro-organisms (i.e., foulants), whereas the less frequently used biorepellants typically have a relatively low toxicity, and work by repelling or deterring the unwanted biological organisms from areas which otherwise would attract foulants.

Most anti-fouling compounds are not efficient against all types of foulants, why combinations of active compounds are employed. In traditional anti-fouling coatings and sealants, the leaching of the active compounds rarely follows the same decay curve. Before the end of its service life, the coating or sealant may thus become only partially successful at preventing fouling.

Various factors such as chemical degradation and dissipation of the biocides due to washing out from the coating or sealant limits the protective life span, rendering it much shorter than the life span of the surfaces etc. which the coatings and sealants were sup-posed to protect. Therefore, prolonging the service life of protective coatings and sealants has a high value.

The release of biocides and/or biorepellants from anti-fouling coatings and sealants can be controlled by encapsulating the active compounds, which prolongs their effective lifetime in different matrices by protecting them from unwanted degradation reactions, and by releasing them slowly. Ideally, an encapsulation method should therefore allow for a high loading of biocide/biorepellant in the encapsulation material with constant release of the active compound from the encapsulation material throughout the service lifetime of the coating or sealant they are components of. This combination of features ensures a long-lasting anti-fouling effect, makes best use of the added active compound, and thereby reduces both the cost of goods (CoG) and the negative environmental impact by requiring less biocide and releasing less biocide unnecessarily to the environment.

The encapsulation concept as such has previously been addressed; see e.g. Jamsa S. et al ("Slow release of a biocidal agent from polymeric microcapsules for preventing biodeterioration", *Progress in Organic Coatings*, Vol 76, Issue 1, January 2013, p 269-276) wherein biocide/biorepellants are trapped inside a water-soluble polymer (such as a poly-ethyleneimine (PEI)) or a polyacrylate capsule. As another similar approach can be mentioned A Kamtsikakis et al. *Bioengineering* 2017, 4(4), 81, "Encapsulation of Anti-fouling Organic Biocides in Poly(lactic acid) Nanoparticles" which describes i.a. the encapsulation of Irgarol 1051, Econea and Zinc pyrithione (ZPT, ZnP) in biodegradable polymer particles.

These methods achieve the goal of reducing the initial leaching of the biocide/biorepellant as the protective polymer shell must first be at least partially dissolved before the biocide/biorepellant can escape the confinement of the capsule, but this particular encapsulation concept does not address the practical requirements of a formulation to be used as a component in a coating or sealant such as an antifouling coating for marine use. A biocide/biorepellant particle surrounded by a thin polymer shell is easily damaged due to the mechanical (shear) forces applied first during mixing into a coating or sealant composition, and later during the application of said coating or sealant to a surface, such as a marine surface, e.g. the hull of a ship or vessel or a submerged static construction. Furthermore, the biocide/biorepellant loading in the polymer capsules as described is not sufficiently high.

In contrast to the physically weak polymer microcapsules discussed above, an inert, mechanically robust material like silica is a better choice for encapsulating active compounds to be dispersed into an anti-fouling coating or sealant composition. Silica gel has the advantage that its hydrophilic/hydrophobic properties can be modified to fit a given product type. A more hydrophobic silica gel may for example be preferable as an additive to a sol-vent-based coating composition, whereas a hydrophilic silica gel will be preferable for a water-borne composition.

The inventors of the present invention initially developed a method for encapsulation of solid active compounds in silica aerogel particles, which is described in international patent application WO 2009/062975. According to the described procedure, aerogels with a content of encapsulated solid active compounds of up to about 50% w/w could be achieved on a small scale. However, attempts at producing aerogels with a content of about 75% w/w encapsulated Zinc pyrithione as the solid active compound using the same procedure, resulted, however, in a product which absorbed water much too readily and moreover seemed heterogeneous. This indicates that the method described in WO 2009/062975 was not able to afford a well-defined loaded aerogel with loadings above app. 50% w/w.

The loading limit of solid active compounds in silica aerogels is of high importance for their eventual use as anti-fouling components in coating or sealant compositions. When biocides encapsulated in silica aerogels are added to an anti-fouling composition, silica is necessarily added as well in the ratio determined by the loading percentage of the particular aerogel. The inventors have found that anti-fouling composition as a rule of thumb should not contain more than about 1.5% w/w $SiO_2$ (silica), as the composition otherwise becomes too thick/viscous and difficult to apply evenly. Therefore, increasing the amount of biocide in an anti-fouling coating or sealant composition cannot be attained just by adding larger amounts of loaded aerogel to the coating compositions because of the 1.5% silica limit. For example:

An aerogel with a 50% content of biocide contains 50% silica. Such an aerogel can thus at most be added in 3% w/w of the composition to keep below the 1.5% silica limit. This means that the final composition will contain 1.5% w/w biocide. It is not possible to add more biocide by this route without exceeding the 1.5% silica limit.

An aerogel with 80% w/w biocide contains 20% silica, so up to 7.5% w/w of this aerogel can be added to the composition. A final composition made with this aerogel will contain 80%×7.5%=6% w/w biocide, and still not more than 1.5% silica.

If an aerogel with a 90% biocide loading is used, 15% w/w of the aerogel can be added, achieving a level of 13.5% w/w biocide in the composition without exceeding the 1.5% "silica limit".

FIG. 2 shows the content of biocide in a coating composition (in w-%) as a function of the biocide loading in the aerogel when max. 1.5% silica may be added to the composition.

There thus remains a need for an improved encapsulation method which can give access to a wide selection of biocides and biorepellants in an encapsulated form with
  a high loading of active compounds, preferably above 55%,
  a sufficient water absorption in the resulting coating or sealant incorporating the encapsulated biocide, and
  a constant concentration of biocide on the surface of the anti-fouling composition over its entire lifetime.

BRIEF DESCRIPTION OF DRAWINGS

FIG. 1 shows the surface of an anti-fouling coating or sealant composition which comprises solid Zn pyrithione (ZnP)-particles (FIG. 1, black circles) which constantly become accessible in the film surface as the coating or sealant is degraded over time, e.g. by exposure to water, high humidity and/or temperature fluctuations. After a while the partially abraded ZnP particles are washed out of the coating (FIG. 1, white half-circles).

FIG. 2 shows the content of biocide in a paint composition (in w-%) which comprises biocide encapsulated in silica aerogel particles as a function of the biocide loading in the aerogel when at most 1.5% silica may be added to the coating.

Figure 3:
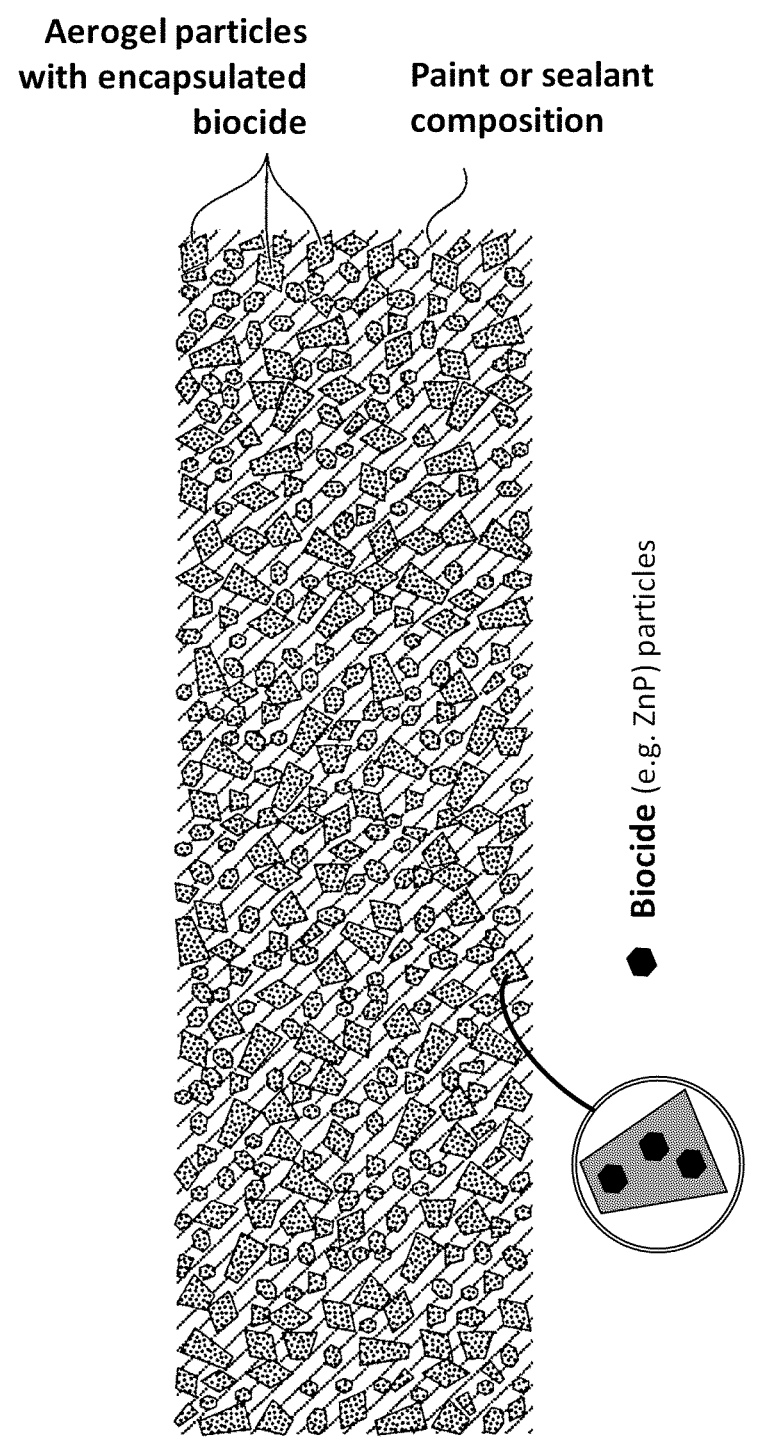

FIG. 3 shows a cross section of an anti-fouling composition layer containing aerogel particles which are distributed uniformly in the layer. The paint layer is in this case app. 300 μm thick. Each aerogel particle may contain several discrete particles of active compound, and each aerogel particle has a dimension, depending on the fineness of grind, of app. 10 μm.

FIG. 4 shows a close-up of the anti-fouling composition layer containing aerogel particles shown in FIG. 3. As the composition is exposed to humidity it starts absorbing water, thereby creating an upper layer termed the leaching layer. The aerogel particles embedded in the leaching layer absorb water due to the porous and hygroscopic nature of silica-based aerogels, and after a while a saturated solution of the active compound (e.g. biocide) is created inside the aerogel particle. By diffusion through the leaching layer, a film of active biocide is created on the surface of the anti-fouling composition layer.

The leaching layer is typically renewed by erosion of the upper part of the layer and penetration of water into the deeper lying areas of the intact anti-fouling composition layer. If erosion is negligible or slow, the leaching layer will increase with time and the biocidal effect will purely be due to diffusion.

FIG. 5 is a table of preferred biocides and biorepellants according to the present invention.

FIG. 6 illustrates the TGA (thermogravimetric) analysis of the biocide ZnP. The figure contains three graphs: The empty aerogel in question, the loaded aerogel and the biocide itself.

From the graph an approximate value for the realized loading can be calculated based on the weight loss of the sample upon heating.

FIG. 7 is a table summarizing the results of Example 8a and 8b.

FIG. 8 is a table comparing aerogels freeze-dried at different freezing temperatures.

Reference D1 and D2 are two empty gels prepared according to the present invention freeze dried at −80° C. and −18° C., respectively.

Reference D3 and D4 are two loaded aerogels prepared according to the present invention containing 65% w/w Diuron where the wet gel was freeze dried at −80° C. and −18° C., respectively.

Reference D5 is a loaded gel prepared identically to D3 and D4 (containing 65% w/w Diuron) but using supercritical drying.

As can be seen from this table, there is a marginal difference in total porosity for aerogels being freeze-dried at −80° C. vs. −18° C., and supercritical drying seems to lead to a slightly higher total porosity. The bulk density of the aerogels seems not to be affected by neither loading nor drying method. The total intrusion volume seems best at indicating a difference between the samples: For aerogels freeze-dried at −18° C. the average total intrusion volume is 1.145 ml/gr. For aerogels freeze-dried at −80° C. the value is 1.255 ml/gr. For supercritically dried aerogels, the value is 0.709 ml/gr.

FIG. 9 shows three different thermogravimetric comparisons of empty and loaded aerogels.

FIG. 9A is a comparison by Thermogravimetric Analysis (TGA) of an empty aerogel prepared according to WO 2020/002659 (solid black graph) with two empty aerogels prepared according to the present invention, where the final drying step has been either supercritical drying (solid grey graph) or freeze-drying (dotted black graph). As can be seen from this figure, the thermal decomposition of the two empty aerogels prepared according to the present invention are practically speaking identical regardless of the drying method. The figure also shows that there is very little difference as regards thermal decomposition of empty aerogels prepared according to the present invention vs. prepared by according to WO 2020/002659.

FIG. 9B is a comparison by TGA of two aerogels prepared according to the present invention containing 76% w/w Zn pyrithione. Both samples were dried by supercritical drying, either over 4 hrs (dotted black graph) or 8 hrs (solid black graph). As can be seen from this figure, there is no difference in weight loss for the two samples, indicating that a drying time of 4 hrs is sufficient.

FIG. 9C is a comparison by TGA of two freeze-dried aerogels prepared according to the present invention, either as an empty gel (solid black graph) or a loaded gel containing 65% Diuron (dotted black graph). Neat (un-encapsulated) Diuron has been included as reference. As can be seen from this figure, the empty gel behaves similarly to the gels of FIG. 9A. It can also be seen that the loaded gel loses approximately 65% weight (as expected) over the course of the TGA analysis.

FIG. 10 is a table comparing the thermal conductivity of two loaded freeze-dried aerogels with an empty aerogel prepared according to WO 2020/002659. Reference TC1 contains 75% Cu pyrithione, TC2 contains 75% Zn pyrithione, and TC3 is an empty gel prepared by supercritical drying (similar to in sample in FIG. 9A). As can be seen from the table, the loaded gels of the present invention have approximately 50% or less of the thermal conductivity of the empty gel prepared according to WO 2020/002659.

SUMMARY OF THE INVENTION

The inventors of the present invention have for a number of years analyzed the behaviour of anti-fouling coatings and sealants which comprise biocidal and/or biorepellant active compounds encapsulated in aerogel particles under different conditions as regards temperature and humidity, and have discovered that the antifouling effect to a large degree is dependent on correctly managing the water absorption of the composition. It has specifically been found that a too low water absorption (<1.5 wt-%) leads to fouling (because the biocide cannot exert its effect under too dry conditions), whereas a too high water absorption can lead to a too fast dissolution and eventual loss of biocide.

It has thus been found important that the anti-fouling composition can absorb enough water to maintain a saturated solution of the active compound in the surface layer of the coating or sealant composition. A value for the water absorption in the range of about 1.5-6% is regarded as optimal.

The inventors have moreover found that to tailor the performance of the anti-fouling coating and sealant composition, the water absorption of the embedded aerogel particles themselves must be controlled. The two most important influential parameters for this purpose are 1) the loading of active compound in the encapsulating aerogel particle and 2) the porosity of said aerogel particles. Also, a high content uniformity, i.e. a highly homogeneous distribution of the encapsulated biocide or biorepellant in the aerogel particles, is also important for the performance of the anti-fouling coating and sealant composition.

It has therefore been an objective of the present invention to afford silica aerogel particles with a high to very high loading (55-95% w/w) of a biocide and/or biorepellant, which aerogel particles—when formulated into anti-fouling coatings—lead to a satisfactory water absorption of the dry coating, such as in the range of 1.5-6% w/w. Coatings meant for on-shore wood constructions can have a higher range, for example up to 11% w/w.

To achieve this objective for a broad range of different biocides and/or biorepellants (which have different physico-chemical properties including solubilities in various solvents and pH tolerance), the inventors have developed a manufacturing procedures for the production of novel aerogel particles comprising encapsulated biocides and/or biorepellants having the required mechanical robustness for formulation into the final compositions and a high to very high loading of active compound.

Upon formulation in anti-fouling coatings and sealants, these novel particles lead to a satisfactory water absorption. The particles have thus been found to be valuable as additives to anti-fouling coatings and sealants, both for off-shore and on-shore purposes.

The anti-fouling additives of the present invention have thus been found useful for coatings to be applied on off-shore surfaces which are regularly or constantly submerged in water. Examples of surfaces which are constantly submerged in water include the hull of boats, ships, and other vessels, including both commercial tankers, pleasure boats and yachts, but also swimming pools, rain water basins, oil rigs and fish-farming constructions comprise construction parts which are constantly submerged. Examples of surfaces which are only regularly submerged in water include static marine constructions such as the lower part of ocean windmill pylons and other off-shore constructions, piers and harbor constructions which experience regular periods of submerging during high tide or through flooding by waves.

The anti-fouling additives of the present invention have also been found useful for coatings and sealants to be applied on on-shore surfaces which are regularly exposed to humid air and rainfall. Such surfaces are typically found on houses and other buildings located in tropical areas and areas which experience frequent rainfalls or dense fogs. Other examples include indoor surfaces of rooms which regularly experience exposure to high air humidity, such as bathrooms, showers, saunas, and indoor swimming pools. For such "humid indoor environments", a particular use of the anti-fouling additives of the present invention has been found in sealants e.g. to be used to fill cracks between tiles and the like, which are often attacked by mold and mildew.

As mentioned hereinabove the present inventors have previously worked with the encapsulation of Zinc pyrithione (ZnP) in aerogels (see e.g. PCT application WO 2009/062975). The new method described herein employs approximately the same ratio of tetraalkoxysilanes and alkyltrialkoxysilanes as in the original procedure described in WO 2009/062975, but employs a much lower amount of water for the gelling process.

Further, less ammonia is used as catalyst, and the ammonia is added gradually in a separate ethanolic solution to the solution of silicates rather than as a concentrated aqueous solution mixed with the starting materials. Further, acidic catalysis has also been shown to be effective for certain cases where the biocide is unstable under alkaline conditions. This work has been described in the inventors' co-pending application WO 2020/002659.

The inventors have continued the development of the encapsulation procedure with an aim to allow for an even wider selection of biocides and biorepellants, which have so far been limited by solubility issues, or incompatibilities with the selected gelling catalysts. This results hereof are discussed in the detailed description, but notably the initially formed alcogel ("wet gel") of the present invention may be dried using freeze-drying (lyophilization) rather than super-critical carbon dioxide extraction. Lyophilization is a commercially much more feasible and scalable procedure than supercritical carbon dioxide extraction. The aerogel particles according to this variation of the manufacturing procedure are thus isolated as a freeze-dried solid.

The new manufacturing procedure has first been used to enable the production of aerogel particles containing high loadings of encapsulated ZnP. The method has subsequently proved able to provide aerogel particles containing high loadings of other encapsulated biocides than ZnP, which as discussed above is important since foulants are typically not sensitive to just one type of biocide. The method reliably affords highly loaded (>55% w/w) aerogels.

The aerogel particles produced by the present invention (including the particles containing ZnP) have been found to have a better homogeneity and a different porosity than the particles produced by the procedure described in WO 2009/062975. This can be measured by mercury intrusion porosimetry and described by for example the intrusion volume or the bulk density for the aerogel particles (See the Examples section).

The aerogel particles produced by the present invention have also been studied as regards their opacity and thermal conductivity.

The loaded aerogel particles of the present invention have thus been found to have quite low thermal conductivities (between 0.01-0.05 W/m*K), rendering them better insulators than the pure biocides and/or biorepellants themselves.

Moreover, the loaded aerogel particles of the present invention have generally been found to be opaque, measured by their "hiding power", or coverage, when tested according to ISO 6504-3:2019 "Determination of hiding power".

What sets the loaded aerogels of the present invention apart from the prior art, including the inventors' own published applications WO 2009/062975 and WO 2020/002659, is thus the high to very high achievable loading of biocide (>55% w/w) coupled with a very low thermal conductivity, typically between 0.01-0.05 W/m*K.

Accordingly, in a first aspect the invention provides an antifouling additive comprising:
  a. an inorganic, silica-containing aerogel comprising
  b. a porous gel lattice, and
  c. optionally an alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
  d. one or more biocidal or biorepellant compounds entrapped in said aerogel, wherein said silica-containing aerogel comprises at least 55% by weight of the one or more biocidal or biorepellant compounds, and wherein the entrapment of said one or more biocidal or biorepellant compounds takes place during the SOL-GEL formation of the gel, and wherein the thermal conductivity of said antifouling additive is between 0.01-0.1 W/m*K.

The particles of the first aspect can as mentioned be afforded by a newly developed manufacturing procedure, which is a further development of the methods described in PCT application WO 2009/062975 and WO 2020/002659. Accordingly, very high amounts of biocides and/or biorepellants ("active compounds") can be encapsulated in situ in an alcogel formed by a two-step procedure using a tetraalkoxysilan (monomeric tetralkylorthosilicate or pre-condensated tetralkylorthosilicate or a combination of a pre-condensated and monomeric tetralkylorthosilicate), optionally in combination with an alkyltrialkoxysilane, + the required active compound in the sol-gel preparation, which in a final step is converted to an aerogel and dried.

The resulting aerogel particles typically contain app. 55-75% w/w content of the encapsulated active compound but can be produced with up to app. 90-95% w/w content depending on the biocide used. By varying the ratio between the starting materials, catalyst, different porosities, densities and hydrophobic/hydrophilic behaviour of the final aerogel particles can be obtained. Aerogel particles can also by such variations of the method be prepared to match both solvent-based and water-borne coatings and sealants.

The invention thus in a second aspect further provides a method for providing an anti-fouling additive of the first aspect, comprising the following steps:
  a. Prepare Solution 1: 100 parts tetraalkoxysilan (monomeric tetralkylorthosilicate or pre-condensated tetralkylorthosilicate or a mixture of pre-condensated and monomeric tetralkylorthosilicate), are mixed with 0-50 parts alkyltrialkoxysilane, 350-500 parts ethanol and 200-450 parts biocide and agitated vigorously with a mixer. Another lower alcohol can be used for the dissolution. An alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu can optionally be added at this point.
  b. Prepare Solution 2: 100 parts Ethanol, app. 50 parts water and 0.25-15 parts of a gelling catalyst are mixed.
  c. Solution 2 is added gradually to Solution 1 with vigorous stirring over 20-25 minutes. Stirring is continued at reduced speed until signs of gelling are observed after approx. 15 minutes. The resulting solution may be transferred into one or more separate containers for gelation. The gelling time is approximately 30-60 minutes.
  d. The gel is stored in suitable containers for 2-5 days after which it is transferred to the extractor(s).

e. The wet gel is cut into smaller pieces and transferred under ethanol to a suitable pressure vessel (flow reactor, equipped with heating jacket and metal frits in both ends). There the gel is flowed with ethanol at 0.5 mL/min. Then the temperature in the heating jacket is raised to 37-40° C. and the pressure raised to 110-115 bars (or app. 80 bars for biocides soluble in ethanol), at a rate of 3 bars/min. for 4-8 hours, until the recovery of ethanol is <1 ml/minute. The exact values of temperature and pressure will depend to some degree on the chosen loaded aerogel, but can easily be assessed by routine experimentation. $CO_2$ is flowed through the vessel at a rate of approximately 6 mL/min measured at 10° C. After flowing the pressure is slowly released during 0.5-several hours.

For the above steps a-e, ethanol can conveniently be replaced by another $C_1$-$C_4$ alcohol such as tert-butanol. Further, as mentioned above, the supercritical drying procedure can be replaced by freeze drying (lyophilization).

In a third aspect there is provided an antifouling additive obtainable by the method according to the second aspect.

In a fourth aspect there is provided the use of an antifouling additive according to the first or third aspect, in marine coatings or coatings intended for wood protection or for humid indoor environments.

In a fifth aspect there is provided an antifouling paint or sealant composition comprising the antifouling additive according to the first or third aspect of the present invention.

DETAILED DESCRIPTION

As described in the summary of invention, the inventors have now developed a new manufacturing procedure for the production of novel aerogel particles comprising encapsulated biocides and/or biorepellants ("active compounds") having the required mechanical robustness for formulation into coating and sealant compositions and a high to very high loading of active compound. Upon formulation in such anti-fouling compositions, these particles lead to a satisfactory water absorption of the dry coating or sealant. The particles have thus been found to be valuable as additives for anti-fouling coating and sealant compositions.

Accordingly, in a first aspect the invention provides an antifouling additive comprising
a. an inorganic, silica-containing aerogel comprising
b. a porous gel lattice, and
c. optionally an alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
d. one or more biocidal or biorepellant compounds entrapped in said aerogel, wherein said silica-containing aerogel comprises at least 55% by weight of the one or more biocidal or biorepellant compounds, and wherein the entrapment of said one or more biocidal or biorepellant compounds takes place during the SOL-GEL formation of the gel, and wherein the thermal conductivity of said antifouling additive is between 0.01-0.05 W/m*K.

In an embodiment of the first aspect, the bulk density of said aerogel has a value of at most 0.5 gr/ml when said aerogel comprises at most 75% by weight Zn pyrithione.

The limitation involving the bulk density for ZnP-containing aerogels (" . . . the bulk density of said aerogel has a value of at most 0.5 gr/ml when said aerogel comprises at most 75% by weight Zn pyrithione") has been introduced to differentiate the specific embodiment of the present invention in which the aerogel particles contain zinc pyrithione from the alleged "75% ZnP aerogel" product produced by the method of WO 2009/062975 and discussed in WALLSTROM, E. et al.: "A new concept for anti-fouling paint for Yachts", PROG. ORG. COAT vol. 72, 2011. pages 109-114.

As mentioned above, it has been found by intrusion porosimetry experiments that loaded aerogels containing app. 75% w/w ZnP prepared with pre-condensated silicates have a significantly lower bulk density and a significantly higher intrusion volume than aerogels produced from normal silicates. As can be seen in the experimental section (Example 8a), the average bulk density of an aerogel containing 75% w/w ZnP produced with normal silicates is about 0.58 g/ml (batch 1A-C) whereas the bulk density for similarly loaded aerogels produced with pre-condensated silicates (batch 2A-B) is about 0.39 g/ml, both set of values measured by mercury intrusion porosimetry. The bulk density for an aerogel matching the "75% ZnP aerogel" produced by the method of WO 2009/062975 was found to be 0.56 g/ml.

The average bulk density of an aerogel containing app. 75% w/w CuP produced by the method of the current invention is also <0.50 g/ml (Example 8b, batch 3A-C, FIG. 7), but the bulk density of the loaded aerogels described herein may vary significantly (see also FIG. 8), not least as a function of actual loading and the density of the employed biocide itself, and is therefore not a general limiting feature of the novel, loaded aerogels. What does set the new loaded aerogels apart from the prior art is primarily or even exclusively the high to very high achievable loading of biocide, which can be verified e.g. by thermogravimetric analysis (TGA), coupled with a very low thermal conductivity, typically between 0.01-0.05 W/m*K.

Using the same manufacturing procedure, the inventors have since produced loaded aerogels with other biocides, e.g. DCOIT, IPBC, Tolylfluanid, Diuron, Cu pyrithione (CuP) and others, see the Examples section.

In preferred embodiments, the antifouling additive of the first aspect comprises aerogel particles which comprise at least 55% by weight encapsulated biocides and/or biorepellants ("active compounds"), such as at least 65% by weight, such as at least 70% by weight, at least 75% by weight, at least 80% by weight, at least 85% by weight, at least 90% by weight or about 95% by weight.

To the best of the inventors' knowledge, aerogels containing such high, homogeneously distributed amounts of encapsulated materials have not previously been disclosed. Previous attempts at producing highly loaded aerogels by the method disclosed in WO 2009/062975 resulted in material with too high a water absorption and a different porosity and homogeneity than the loaded aerogels of the present invention. The inventors in co-pending WO 2020/002659 further developed the methodology, and in the present application have succeeded in developing manufacturing methods which may accommodate a wider range of biocides/biorepellants and still maintain the original objective.

The highly loaded gel particles of the present invention thus allow for high amounts of biocides and/or biorepellants ("active compounds") to be added to anti-fouling coatings and sealants, whilst keeping the concomitantly added amount of silica below the 1.5% w/w limit discussed above.

According to the manufacturing procedure disclosed herein, very high amounts of biocides and/or biorepellants ("active compounds") can be encapsulated in situ in an alcogel formed by a two-step procedure using a tetraalkoxysilan (monomeric tetralkylorthosilicate or pre-condensated tetralkylorthosilicate or a combination of a pre-condensated and monomeric tetralkylorthosilicate), optionally in combination with an alkyltrialkoxysilane+ the required active compound in the sol-gel preparation, which in a final step is converted to an aerogel and dried.

This new method employs approximately the same ratio of tetraalkoxysilanes and alkyltrialkoxysilanes as in the original procedure described in PCT application WO 2009/062975, but a much lower amount of water for the gelling process. Further, less ammonia is used as catalyst, and the ammonia is added gradually in a separate ethanolic solution to the solution of silicates rather than as a concentrated aqueous solution mixed with the starting materials. Additionally, acid catalysis has also been shown to work, which has enabled the encapsulation of biocides sensitive to ammonia or alkaline condition in general.

An even further improvement of the manufacturing process as compared to the methods disclosed in applicant's co-pending PCT application WO 2020/002659 has surprisingly been achieved by performing the SOL-GEL process with a high amount of water and a reversed addition procedure. This has allowed for the encapsulation of biocides/biorepellants with a high solubility in ethanol, and has the added advantage that the resulting gel is suitable for freeze-drying due to the higher melting point of frozen gels with a high ratio of water in the SOL phase.

Finally, the manufacturing procedure of the present invention differs from that of WO 2020/002659 in that the initially formed alcogel ("wet gel") may be dried using freeze-drying (lyophilization) rather than supercritical carbon dioxide extraction. Lyophilization is a commercially much more feasible and scalable procedure than supercritical carbon dioxide extraction. The aerogel particles according to this variation of the manufacturing procedure are thus isolated as a freeze-dried solid.

In an embodiment, the wet gels of the invention can be frozen by any freezing technique known in the art. If the gels are kept inside the containers used for e.g. aging of the gels after the SOL-GEL process step, freezing can be carried out by placing the gels into liquid nitrogen, into a cryogenic mixture (e.g., dry-ice acetone bath), or inside a refrigerator. Any freezing method works, provided that the gels are brought to a temperature below the freezing temperature of the solvent used for the synthesis or solvent exchange. Use of tert-butanol as a solvent appears to be especially advantageous for the freeze-drying procedure, since this solvent freezes just about at room temperature and therefore it does not require to be cooled to low temperatures (a household freezer is sufficient). However, any solvent with a low freezing temperature may work, such as for example ethanol, 1-butanol, dimethyl sulfoxide, and carbon tetrachloride. The frozen gel is then dried using a conventional freeze dryer or, more simply, placed in a vacuum chamber which is pumped by a conventional rotary pump. The part of the chamber hosting the sample must however be kept at temperatures around the freezing temperature of the solvent to avoid melting which may lead to collapse of the aerogel.

Freeze-drying has been tested at two different temperatures: −18° C. and −80° C. (see FIG. 8) and must be deemed well-suited for scale-up. The resulting aerogels do not differ in any critical parameter from material produced by supercritical drying and is more cost-effective.

These changes to the procedures described in WO 2009/062975 and WO 2020/002659 have enabled the scalable production of loaded aerogels with very high (>55% w/w) loadings of a wide variety of active compounds (e.g. biocides and biorepellants), acceptable water absorption and much higher homogeneity of the loaded gels than obtainable by the procedure described in WO 2009/062975.

The resulting aerogel particles typically contain app. 55-75% w/w content of the encapsulated active compound but can be produced with up to app. 90-95% w/w content. By varying the ratio between the three starting materials, different porosities, densities and hydrophobic/hydrophilic behaviour of the final aerogel particles can be obtained. Aerogel particles can also by such variations of the method be prepared to match both solvent-based and water-borne coatings and sealants.

As mentioned, other physical parameters of the aerogel particles produced by the present invention have also been studied, such as their opacity and thermal conductivity.

Both parameters are important for the intended end-use of the particles: as additives to paints, coatings, and sealants. The opacity of such particles, as measured by their "hiding power" (also known as coverage), affects the application efficiency of paint and coatings containing said particles to marine coatings or coatings intended for wood protection or for humid indoor environments. The higher the hiding power of the particles, the more efficiently will the paint composition cover the surface.

The thermal conductivity of additives to paints and coatings affect the dissipation of heat through the surface coated with a paint or coating containing said additives. The lower the thermal conductivity of the additive, the better insulation does it provide. It is known that empty silica aerogel particles reduce the thermal conductivity of coatings, see e.g. F. He et al., "Thermal Conductivity of Silica Aerogel Thermal Insulation Coatings" International Journal of Thermophysics 40(10) October 2019.

Silica aerogels are known to be highly porous (~80-99.98%), optically transparent nano polymers with a low thermal conductivity (0.005 W/m*K) when measured at a temperature between −175-25° C., see e.g. S. S. Kistler, "Coherent Expanded Aerogels," The Journal of Physical Chemistry, 1932 or CRC Handbook of Chemistry and Physics.

Surprisingly, the loaded aerogel particles of the present invention have been found to have thermal conductivities between 0.01-0.05 W/m*K (see FIG. 10), even if they contain up to 90% w/w of encapsulated biocides and/or biorepellants which as pure compounds have thermal conductivities on the order of 0.2-0.3 W/m*K. This means that anti-fouling paints and coatings containing the loaded aerogel particles of the present invention will have better insulating properties than coatings containing the pure, non-encapsulated biocides and/or biorepellants.

Applicant has compared the thermal conductivity of loaded aerogel particles of the present invention with empty aerogel particles prepared according to the methods described in applicant's co-pending application WO 2020/002659. Surprisingly, these empty aerogel particles (i.e. aerogels which do not contain encapsulated biocides/biorepellants) of WO 2020/002659 have thermal conductivities of around 0.07 W/m*K, i.e. a significantly higher value than measured for the loaded aerogel particles of the present invention. Without wishing to be bound by theory, the inventors assume that the methods of the present applicant lead to a material with lower bulk density and improved content uniformity than produced by the methods disclosed in WO 2020/002659.

In an embodiment, the loaded aerogel particles of the present invention have thermal conductivities between 0.01-0.05 W/m*K such as between 0.015 W/m*K and 0.045 W/m*K, such as between 0.02 W/m*K and 0.04 W/m*K, such as between 0.025 W/m*K and 0.035 W/m*K, such as around 0.03 W/m*K.

Moreover, the loaded aerogel particles of the present invention have generally been found to be opaque, using the "Hiding Power" measuring standard ISO 6504-3:2019 for paints and varnishes, "Determination of hiding power—Part 3: Method C (black and white charts)". The loaded aerogel particles when applied in clear varnish were thus found to have "hiding power" according to the ISO standard 6504-3:2019(EN).

Partially condensed silica made from a prepolymerization of tetraalkoxysilanes such as TMOS or TEOS monomers under acidic conditions can be used to prepare monolithic silica aerogels. The prepolymerized TMOS and TEOS precursors used herein are commercially available.

The invention thus in a second aspect further provides a method for providing the antifouling additive of the first aspect, comprising the following steps:

a. Prepare Solution 1: 100 parts tetraalkoxysilan (monomeric tetralkylorthosilicate or pre-condensated tetralkylorthosilicate or a mixture of pre-condensated and monomeric tetralkylorthosilicate), are mixed with 0-50 parts alkyltrialkoxysilane, 350-500 parts ethanol and 200-450 parts biocide and agitated vigorously with a mixer. An alcoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu can optionally be added at this point.

b. Prepare Solution 2: 100 parts Ethanol, app. 50 parts water and 0.25-15 parts of a gelling catalyst are mixed.

c. Solution 2 is added gradually to Solution 1 with vigorous stirring over 20-25 minutes. Stirring is continued at reduced speed until signs of gelling are observed after approx. 15 minutes. The resulting solution may be transferred into one or more separate containers for gelation. The gelling time is approximately 30-60 minutes.

d. The gel is stored in suitable containers for 2-5 days after which it is transferred to the extractor(s).

e. The wet gel is cut into smaller pieces and transferred under ethanol to a suitable pressure vessel (flow reactor, equipped with heating jacket and metal frits in both ends).

There the gel is flowed with ethanol at 0.5 mL/min. Then the temperature in the heating jacket is raised to 37-40° C. and the pressure raised to 110-115 bars (or app. 80 bars for biocides soluble in ethanol), at a rate of 3 bars/min. for 4-8 hours, until the recovery of ethanol is <1 ml/minute. The exact values of temperature and pressure will depend to some degree on the chosen loaded aerogel but can easily be assessed by routine experimentation. $CO_2$ is flowed through the vessel at a rate of approximately 6 mL/min measured at 10° C. After flowing the pressure is slowly released during 0.5-several hours.

For the above steps a-e, ethanol can conveniently be replaced by another $C_1$-$C_4$ alcohol such as tert-butanol. Further, as mentioned above, the supercritical drying procedure can be replaced by freeze drying (lyophilization).

According to embodiments of the methods of the invention, lyophilized loaded aerogels can thus be produced by initially freezing the wet gel produced according to step a-c hereinabove. The frozen gel is next placed in a vacuum chamber where the solvent is removed by sublimation. These two steps can be accommodated in a commercial freeze-dryer.

Advantages over supercritical drying, only some of which are discussed herein, include primarily a much less complex scale-up of the manufacturing procedure, but also a reduction in hazard risks posed by drying at supercritical conditions. A second advantage of the lyophilization procedure is a substantial reduction in capital expenditures. Autoclaves used for supercritical drying require thick walls and pose liability issues because of the high pressures (on the order of 70 atmospheres) used in supercritical drying. Freeze drying uses vacuum chamber(s) instead which are much cheaper to produce and pose minimal liability issues.

Typically, a supercritical drying autoclave costs 10 times more than a freeze-drying vacuum chamber of the same capacity.

In an embodiment of the manufacturing procedure, Solution 1 contains 20-50 parts alkyltrialkoxysilane. In another embodiment, in particular if a hydrophilic loaded aerogel is envisaged or a very high loading of biocide is required, Solution 1 contains less than 20 parts alkyltrialkoxysilane, such as 15 parts, or such as 10 parts, or such as 5 parts or less. In another embodiment, Solution 1 contains no alkyltrialkoxysilane.

The tetraalkoxysilanes that may be employed in the present invention comprise alkyl groups ranging from 1 to 4 carbon atoms such as methyl, ethyl, propyl, and butyl. The most preferred tetraalkoxysilanes are tetramethyl orthosilicate (TMOS) and tetraethyl orthosilicate (TEOS).

In preferred embodiments the tetraalkoxysilane is selected from TMOS (Tetramethyl orthosilicate), TEOS (Tetraethyl orthosilicate), tetra-n-propoxysilane and tetra-n-butoxysilane.

In another preferred embodiment the pre-hydrolysed/pre-condensated tetraalkoxysilane is selected from pre-hydrolysed tetramethylorthosilicate, (eg. Dynasylan© M), pre-hydrolysed tetraethylorthosilicate (eg. Dynasylan© A) or pre-hydrolysed tetra n-propylorthosilicate (eg. Dynasylan© P).

In a preferred embodiment the alkyltrialkoxysilane is selected from MTMS (methyltrimethoxysilane) and MTES (methyltriethoxysilane), but other lower alkyltrialkoxysilanes such as TMES (trimethylethoxysilane) and ETES (ethyltriethoxysilane) may also be employed.

The gelling catalyst can be any conveniently used catalyst for aerogel formation, such as aqueous ammonia (conveniently concentrated aq. NH3 or 25% in water). Other applicable gelling catalysts include ammonium fluoride, sodium fluoride and sodium carbonate. Such alternative catalysts are preferred in cases where the biocide may react with ammonia. Acidic catalysis can also be used, such as e.g. with hydrochloric acid, in particular in cases where the biocide to be entrapped is sensitive to ammonia or alkaline conditions in general.

Examples of using various versions of the generic method can be found in the Experimental section, including scale-up experiments.

In a third aspect there is provided an antifouling additive obtainable by the method according to the second aspect.

In preferred embodiments the invention provides an antifouling additive according to the first or third aspect of the invention, which comprises one or more biocidal or biorepellant compounds selected from the group consisting of: pyrithione compounds, basic copper carbonate, isothiazolinone compounds, substituted triazines, carbamates, chlorinated aromatic ureas, triazoles and combinations thereof. Examples of pyrithione compound include metal pyrithione compounds such as zinc pyrithione, copper pyrithione, zirconium pyrithione, sodium pyrithione and the like. Examples of isothiazolinone compounds include, for example: 4,5-Dichloro-2-n-octyl-4-isothiazolin-3-one (DCOIT), 1,2-benzisothiazolin-3-one (BIT), n-butyl isothiazolinone (BBIT), n-octyl isothiazolinone (OIT) and mixtures thereof. Substituted triazines include, for example, terbutryn (2-tert-butylamino-4-ethylamino-6-methylthio-1,3,5-triazine). Carbamates include, for example iodopropynyl butylcarbamates (IPBC). Chlorinated aromatic ureas, include, for example, diuron (dichlorophenyl dimethylurea). Of the pyrithione compounds, generally, zinc pyrithione is used from the stand-point of cost and effectiveness. Depending on the intended use of the encapsulated biocidal or biorepellant compound, those skilled in the art would be able to determine which active ingredients could be used in the present invention.

In an embodiment, the antifouling additive according to the first or third aspect of the invention is produced by a process which comprises supercritical extraction with $CO_2$. In another embodiment, the antifouling additive according to the first or third aspect of the invention is produced by a process which comprises freeze drying (lyophilization).

As used herein, the term "biocidal or biorepellant compounds" is intended to mean an ingredient which has biocidal or biorepellant properties, including, but not limited to active ingredients that are antimicrobial, sporicidal, fungicidal and the like.

The intended use of the anti-fouling additive of the present invention is to be added to an anti-fouling coating or sealant composition to be applied for wood protection (fences, buildings etc.), marine use (boats, pleasure yachts, commercial vessels, static constructions submerged in water such as oil rigs and other off-shore constructions etc.) and humid indoor environments such as bathrooms, toilets, saunas, gyms, indoor swimming pool areas etc. which are naturally/regularly exposed to humid conditions and/or water.

When the prepared aerogel particles are included in an anti-fouling coating or sealant, the encapsulated active compound is distributed uniformly in the resulting layer. Each aerogel particle may contain several discrete particles of active compound (FIG. 3).

In a fourth aspect there is therefore provided the use of an antifouling additive according to the first or third aspect, in marine coatings or coatings intended for wood protection or for humid indoor environments.

In a fifth aspect there is provided an antifouling coating or sealant composition comprising the antifouling additive according to the first or third aspect of the present invention.

An antifouling coating layer typically has a thickness of around 100 µm, whereas a sealant is applied in much higher thickness. In both cases, however, when the anti-fouling composition is exposed to humid conditions, as discussed hereinabove, a layer of approximately 20-40 µm in thickness is gradually developed which has absorbed water from the surroundings (Bressy C. et al. "Tin-free self-polishing marine antifouling coatings" Woodshead Publishing, 2009). The thickness of this layer depends on the type of antifouling coating or sealant composition: solvent based compositions as a rule absorb water less readily than water-borne compositions. This "wetted" layer is referred to as the leaching layer, as it is from this layer of the cured composition that the biocidal active compound(s) are dissolved and transported by diffusion to the surface.

The aerogel particles embedded in the leaching layer of the coating or sealant start absorbing water due to the porous and hygroscopic nature of silica-based aerogels. This creates a local aqueous environment inside the exposed aerogel particles around the entrapped active compound particles, which slowly start dissolving. After a while a saturated solution of the active compound is created inside the aerogel particle (FIG. 4).

This saturated solution then serves as a reservoir of active compound, and release hereof to the surface of the anti-fouling coating or sealant occurs when the active compound permeates the porous structure of the aerogel particle and out onto the surface of the anti-fouling coating or sealant. The leaching layer is constantly renewed by erosion of the upper part of the layer due to either passage of the coated surface through water or exposure to (for static outdoor applications) rain, sunshine, and temperature fluctuations. For indoor applications the erosion will be caused by regular exposure to water, such as in showers, and physical cleaning of the surfaces, also with detergents, where the anti-fouling composition has been applied. Whilst the leaching layer is thereby reduced in thickness by erosion from the top, it is simultaneously renewed by inclusion of deeper lying areas of the anti-fouling composition layer.

The erosion and renewal of the leaching layer secures that for the full service life of the dry anti-fouling composition there is always sufficient amounts of biocide present to maintain the desired anti-fouling effect on the surface of the dry anti-fouling composition.

When the leaching layer is eroded, the embedded aerogel particles become gradually exposed to the environment. However, even when partially exposed, the aerogel particles remain stuck (together with their remaining content of biocide) in the anti-fouling composition until they are eventually removed by erosion of the coating or sealant as discussed above.

This is an important difference vis-h-vis the situation shown in FIG. 1, which illustrates that non-entrapped biocide particles are lost from the coating long before they have fully been used to exert an anti-fouling effect.

As long as there remains undissolved active compound present inside the aerogel particles, thereby ensuring a saturated reservoir of dissolved active compound, release to the surface will take place with substantially zero order kinetics. The release profile over time is in other words substantially linear.

The concentration of the biocide/biorepellant on the surface of the anti-fouling coating is thus kept practically constant during the expected service life of the coating or sealant, as long as the surface is regularly exposed to humidity such as humid air, in particular air having a relative humidity of >65%, rain or contact with a body of water. If more than one biocide/biorepellant is required, each active compound can be individually encapsulated and included in the anti-fouling composition in the correct ratio, thus securing that the individual active compounds do not interact with each other during storage, and that a constant ratio between the released compounds from the final coating or sealant is maintained during its expected service life.

In preferred embodiments, the present invention provides antifouling coating compositions comprising an amount of antifouling additive according to current invention, which corresponds to at least 2% w/w biocide, such as to at least 3% w/w biocide, such as to at least 4% w/w biocide, such as to at least 5% w/w biocide, such as to at least 6% w/w biocide, such as to at least 7% w/w biocide.

In a further embodiment of the present invention, an anti-fouling coating is provided which comprises two or more different biocides and/or biorepellants, encapsulated individually in different aerogels, which are then added to the anti-fouling composition in the required ratio.

The procedure described herein has been found to work well for many dis-tinctly different chemical structures, such as pyrithiones, isothiazoles and isothiazolones, triazoles, imidazoles and benzimidazoles, halogenated pyrroles, ureas, carbamates, sulfamides, and zinc and copper salts such as zinc thiocarbamate, copper thiocyanate, copper (II) hydroxide and copper(II) carbonate-copper(II) hydroxide (1:1) and metallic copper.

In one embodiment the encapsulated biocidal or biorepellant compound is selected from pyrithiones of formula:

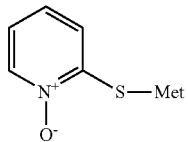

wherein Met is a metal chosen from Copper, Zinc, Zirconium, or Sodium.

In a preferred embodiment the encapsulated biocidal or biorepellant compound is selected from Zinc pyrithione, Copper pyrithione or Sodium Pyrithione.

In another embodiment the encapsulated biocidal or biorepellant compound is selected from isothiazoles of formula:

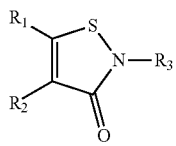

wherein $R_1$ and $R_2$ may be halogen or hydrogen, or $R_1$ and $R_2$ may be fused to form an optionally further substituted aromatic ring and $R_3 = C_3$-$C_{12}$ alkyl.

In a specific embodiment the biocidal or biorepellant compound is selected from 2-butyl-benzo[d]isothiazol-3-one (BBIT), 2-octyl-2H-isothiazol-3-one (OIT) or 4,5-Dichloro-2-octylisothiazol-3(2H)-one (DCOIT, Sea-Nine).

In another embodiment the encapsulated biocidal or biorepellant compound is selected from triazoles of formula:

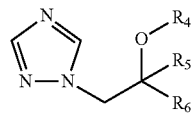

wherein $R_4$=hydrogen, $C_1$-$C_6$ alkyl, $R_5$=$C_1$-$C_6$ alkyl, $C_1$-$C_6$ alkyloxy, $R_6$=aryl, $C_1$-$C_6$ arylalkyl and wherein $R_4$ and $R_5$ may be fused to form a 5-6 membered ring containing at least one oxygen.

In a specific embodiment the biocidal or biorepellant compound is selected from 1-(4-chlorophenyl)-4,4-dimethyl-3-(1,2,4-triazol-1-yl-methyl)pentan-3-ol (Tebuconazole), 1-[[2-(2,4-dichlorophenyl)-4-propyl-1,3-dioxolan-2-yl]methyl]-1H-1,2,4-triazole (Propiconazole), or (2RS,3RS; 2RS,3SR)-2-(4-chlorophenyl)-3-cyclopropyl-1-(1H-1,2,4-triazol-1-yl)butan-2-ol (Cyproconazole).

In another embodiment the encapsulated biocidal or biorepellant compound is selected from triazines of the general formula:

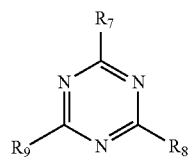

wherein $R_7$=$C_1$-$C_6$ alkylthio, $R_8$=$C_1$-$C_6$ alkylamino and $R_9$=$C_1$-$C_6$ alkylamino.

In a preferred embodiment the biocidal or biorepellant compound is 2-ethylamino-6-methylthio-4-tert-butylamino-1,3,5-triazine (Terbutryn).

In another embodiment the encapsulated biocidal or biorepellant compound is selected from imidazoles of the general formula:

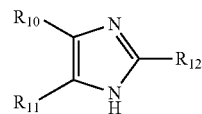

wherein $R_{10}$ and $R_{11}$ may be hydrogen, $C_1$-$C_6$ alkyl or $C_1$-$C_3$ arylalkyl, or be fused to form a benzimidazole ring, and $R_{12}$=hydrogen, heteroaryl or carbamoyl.

In a specific embodiment the biocidal or biorepellant compound is selected from 2-thiazol-4-yl-1H-benzoimidazole (Thiabendazole), (RS)-4-[1-(2,3-Dimethylphenyl)ethyl]-3H-imidazole (Medetomidine) and Methyl 1H-benzimidazol-2-ylcarbamate (Carbendazim).

In another embodiment the encapsulated biocidal or biorepellant compound is selected from halogenated pyrroles of the general formula:

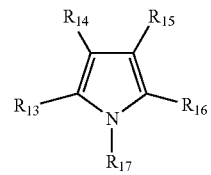

wherein $R_{13}$=Aryl, $R_{14}$=halogen, cyano, trifluoromethylsulfonyl, $R_{15}$=halogen, trifluoromethylthio, $R_{16}$=cyano, trifluoromethyl, halogen, $R_{17}$=hydrogen, $C_2$-$C_6$ alkyloxymethyl,
wherein at least one of $R_{14}$, $R_{15}$ and $R_{16}$ is halogen.

In specific embodiments the biocidal or biorepellant compound is selected from 4-Bromo-2-(4-chlorophenyl)-5-(trifluoromethyl)-1H-pyrrole-3-carbonitrile (Tralopyril) and 4-bromo-2-(4-chlorophenyl)-1-ethoxymethyl-5-trifluoromethylpyrrole-3-carbonitrile (Chlorfenapyr).

In another embodiment the encapsulated biocidal or biorepellant compound is selected from carbamates, ureas or sulfamides of the general formula:

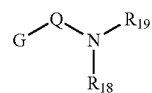

wherein Q=carbonyl (C=O) or sulfonyl (O=S=O), $R_{18}$=aryl, $C_1$-$C_8$ alkyl, hydrogen and $R_{19}$=$C_1$-$C_6$ alkyl, hydrogen, G=O—$R_{20}$ or $N(R_{21}R_{22})$ wherein $R_{20}$=$C_3$-$C_6$ alkynyl, $C_1$-$C_6$ alkyl, $R_{21}$=$C_1$-$C_8$ alkyl, trihalomethylthio, hydrogen and $R_{22}$=$C_1$-$C_8$ alkyl, aryl, hydrogen.

In a further embodiment the biocidal or biorepellant compound is selected from carbamates, ureas or sulfamides of the below three general formulae, respectively:

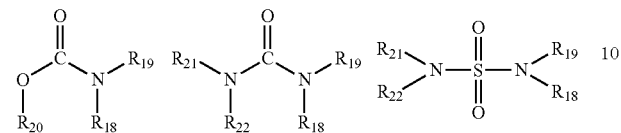

wherein $R_{18}$=aryl, $C_1$-$C_8$ alkyl, hydrogen and $R_{19}$=$C_1$-$C_6$ alkyl, hydrogen, $R_{20}$=$C_3$-$C_6$ alkynyl, $C_1$-$C_6$ alkyl, $R_{21}$=$C_1$-$C_8$ alkyl, trihalomethylthio, hydrogen and $R_{22}$=$C_1$-$C_8$ alkyl, aryl, hydrogen.

In specific embodiments the biocidal or biorepellant compound is selected from 3-(3,4-dichlorophenyl)-1,1-dimethylurea (Diuron), Dichloro-N-[(dimethylamino)-sulphonyl]-fluoro-N-(p-tolyl)-methanesulphenamide (Tolylfluanid), N-(Dichlorofluoromethylthio)-N',N'-dimethyl-N-phenylsulfamide (Dichlofluanid), 3-iodo-2-propynyl butylcarbamate (Iodocarb).

In yet another embodiment the encapsulated biocidal or biorepellant compound is selected from zinc and copper salts such as zinc thiocarbamate, copper thiocyanate, copper (II) hydroxide and copper(II) carbonate-copper(II) hydroxide (1:1), and metallic copper.

In particularly preferred embodiments, the encapsulated biocidal or biorepellant compound is selected from Tolyolfluanid, N,N-Didecyl-N,N-dimethylammonium Carbonate, N,N-Didecyl-N,N-dimethylammonium Bicarbonate, Zinc pyrithione, Copper pyrithione, Diuron, 4,5-Dichloro-2-octyl-4-isothiazolin-3-one (=Sea-Nine or DCOIT), 3-iod-2-propynylbutylcarbamate (IPBC), 2-thiazol-4-yl-1H-benzoimidazole (Thiabendazole), 2-(p-chlorophenyl)-3-cyano-4-bromo-5-trifluoromethyl pyrrole (=Econea or Tralopyril) or mixtures thereof.

EXPERIMENTAL

Materials Used in the Aerogel Syntheses.

Gel forming materials are selected from metal oxides based on Si, Ti, Fe and Al such as tetramethylorthosilicate (TMOS, tetramethoxysilane) or tetraethylorthosilicate (TEOS, tetraethoxysilane). To make a more hydrophobic material methyltrimethoxysilane (MTMS or similar) can be included. Pre-polymerised (pre-hydrolysed, precondensated) tetraalkoxysilanes are either commercially available or can be produced by hydrolysis of the relevant tetraalkoxysilane under weakly acidic conditions followed by polymerization at low temperature overnight.

General Methods Used for Preparing Aerogels with Encapsulated Biocides/Biorepellants.

To accommodate for a broad selection of biocides/biorepellants which have different solubilities and tolerance towards acidic or alkaline conditions, and for allowing the use of different combinations of tetraalkoxysilanes and alkyltrialkoxysilanes, the following methods have been developed for the production of the encapsulated biocides/biorepellants of the present invention.

Original recipe (WO 2020/002659) Dynasylan M/TMOS gels (used for encapsulating compounds having a low solubility in ethanol/alcohol, e.g. CPT, ZPT, Zineb, Diuron)

1. Dynasylan M, MTMS (with or without) and EtOH are mixed 10 minutes on a magnetic stirrer. Add biocide and mix vigorously for approx. 5 min or until a homogenous mixture is achieved.
3. $NH_4OH$ is mixed with EtOH+water and added with stirring to the biocide mixture.
4. The stirring speed is reduced until the reaction mixture becomes bulky like a pudding, which takes app. 15-25 minutes.
5. The container is closed, and a small amount of ethanol is added on top of the gel to avoid drying. The material is left to mature for app. 3 days (can be done in the fridge).

The resulting gel material is suitable for drying with supercritical CO2. To freeze-dry the gel material, it is necessary to substitute the ethanol in the wet stage with e.g. an alcohol with a higher melting point such as tert-butanol. See the general drying methods section below.

Gel preparation—ammonium fluoride—gels with TEOS/ Dynasylan A (e.g. CPT, ZPT, Zineb, Diuron, Econea) Stock Solution Preparation Weigh 1.852 g NH4F and add it to 100 mL of water. Add 20.50 g (22.78 mL) ammonium hydroxide solution. Store this in a bottle so you can reuse it later. This is the "ammonium fluoride/ammonium hydroxide stock solution". Gel Preparation 1. Mix Dynasylan A/TEOS and ethanol in a jar. Allow it to mix for 10 minutes. This is the "alkoxide solution".
2. Add biocide to alkoxide solution. Stir for 5 minutes
3. Mix water and ethanol in another container. Add ammonium fluoride/ammonium hydroxide stock solution. This mixture is the "catalyst solution".
4. Pour the catalyst solution into the alkoxide solution and stir. This is the "sol".
5. Stir until the magnet gets stuck or pour the sol into molds and allow gel to form. Gel time is approximately 8-40 min. Gelling time depends on alcohol/water ratio and (DynA+MTMS) to (water+ethanol) ratio.
6. The container is closed, and the material can be left to mature for approx. 3 days (can be done in the fridge).

This gel material is suitable for freeze drying as long as the freezing/melting point is kept above −60° C.

This gel material is suitable for drying with supercritical CO2 as long as the water content is low. Otherwise the ethanol has to be replaced by e.g. tert-butanol.

Gel Preparation—reversed order with a high water ratio (for e.g. Iodocarb, Terbutryn, Tolylfluanid, due to ethanol solubility/miscibility)

1. Mix water, ethanol, dispersant (and antifoam) in a jar. Allow it to mix for 10 minutes on magnetic stirrer.
2. Add biocide. Stir for 10 minutes
3. Mix TMOS (and MTMS) in another container.
4. Pour the TMOS/MTMS into the EtOH/water solution/biocide and stir for 5 minutes.
5. Add $NH_4OH$-base catalyst.
6. Stir until the magnet gets stuck or pour the sol into molds and allow gel to form.
7. The container is closed, and the material can be left to mature for approx. 3 days (can be done in the fridge).

This gel material is suitable for freeze drying.

Gel Preparation—acid (required for DCOIT, others? miscible in ethanol, unstable and sensitive to alkaline)

1. Mix water, ethanol, dispersant in a jar. Allow it to mix for 10 minutes on magnetic stirrer.
2. Add HCL and mix 10 minutes.

3. Add biocide. Stir for 10 minutes
4. Mix Dynasylan A and MTMS in another container.
5. Pour the DynA/MTMS into the EtOH/water solution/biocide and stir for 5 minutes.
6. Add NH4OH-base catalyst.
7. Stir until the magnet gets stuck or pour the sol into molds and allow gel to form.
8. The container is closed, and the material can be left to mature for approx. 3 days (can be done in the fridge).

This material is suitable for freeze drying.

General drying methods including solvent exchange

After pouring into airtight molds, all gels are aged for 1-3 days at RT. For supercritical drying, the wet gel is cut into smaller pieces and transferred under ethanol to a pressure vessel (flow reactor, equipped with heating jacket and metal frits in both ends) and optionally flowed with ethanol at 0.5 mL/min.

Then the temperature in the heating jacket is raised to 37-40° C. and the pressure raised to 80-120 bars, at a rate of 3 bars/min. For 3-4 hours (up to 8) at 40° C. and 110 bars, until the recovery of ethanol is <1 ml/minute $CO_2$ was flowed through the reactor at a rate of approximately 6 mL/min measured at 10° C. After flowing the pressure is slowly released during 0.5 to several hours.

Depending on the composition of the SOL phase, the solvent in the wet gel may be exchanged with tert-butanol (4× the volume of gel, 3 times every 4 h) before freeze drying. For wet gels containing a high ratio of water, solvent exchange is not required before freezing. For wet gels containing a high ratio of ethanol, solvent exchange with tert-butanol before freezing allows for subsequent freeze-drying at a higher temperature which is preferred for larger scale operation.

Freeze drying was carried out in a commercial freeze dryer (VirTis model Benchtop K) at −18° C. or −80° C. Gels containing tert-butanol are frozen at −18° C. in a commercial refrigerator and freeze-dried at a shelf temperature of about −7° C. and a pressure <3 Torr. For such gels the freezing temperature is typically −18° C. or lower. The frozen gel is freeze-dried in a vacuum chamber maintaining a temperature around the chosen freezing temperature at the beginning the primary drying phase. During the drying process the temperature can slowly be raised.

Example 1. Preparing an Aerogel with App. 75% Encapsulated Biocide (ZnP)

1. Solution 1: 0.64 kg pre-condensated TMOS (Tetramethyl orthosilicate) like Dynasylan M or pure TMOS, 0.32 kg MTMS (methyltrimethoxysilane), 3.2 kg Ethanol and 1.44 kg Zinc pyrithione was mixed in a 10-ltr vessel and agitated vigorously with a paddle mixer until homogenous.
2. Solution 2: 0.64 kg Ethanol, 0.32 kg Water and 10 ml of ammonia solution (concentrated) is mixed.
3. Solution 2 is added to solution 1 at identical mixing conditions as in (1) for 10-25 minutes at 500 rpm. Mixing speed is reduced to about 100 rpm until signs of gelling appear within app. 15 minutes. The gelling time is approximately 30 minutes.
4. The gel is stored in plastic containers for 3-5 days after which it is transferred to the extractor(s).
5. The wet gel from 3) was cut into smaller pieces and transferred under ethanol to a 5 or 10 L pressure vessel (flow reactor, equipped with heating jacket and metal frits in both ends). The gel can be flowed with ethanol at 0.5 mL/min, but it is not necessary. Then the temperature in the heating jacket was raised to 37-40° C. and the pressure raised to 110-115 bars, at a rate of 3 bars/min. For 3-4 hours (up to 8) at 37-40° C. and 110 bars, until the recovery of ethanol is <1 ml/minute. CO2 was flowed through the vessel at a rate of approximately 6 mL/min measured at 10° C. After flowing the pressure was slowly released during 0.5 to several hours. The weight of the supercritical dried aerogel was approximately 1.9 kg.

Example 2. Preparing an Aerogel with App 80% Encapsulated Biocide (CuP)

1. Solution 1: 0.96 kg pre-condensated TMOS (Tetramethyl orthosilicate) like Dynasylan M or pure TMOS, 3.2 kg Ethanol and 1.77 kg Copper pyrithione was mixed in a 10-ltr vessel and agitated vigorously with a paddle mixer until homogenous.
2. Solution 2: 0.64 kg Ethanol, 0.32 kg Water and 10 ml of ammonia solution (concentrated) is mixed.
3. Solution 2 is added to solution 1 at identical mixing conditions as in (1) for 10-25 minutes at 500 rpm. Mixing speed is reduced until signs of gelling takes approx. 15 minutes (100 rpm). The gelling time is approx. 30 minutes.
4. The gel is stored in plastic containers for 3-5 days after which it is transferred to the extractor(s).

The wet gel from 3) was cut into smaller pieces and transferred under ethanol to a 5 or 10 L pressure vessel (flow reactor, equipped with heating jacket and metal frits in both ends). The gel can be flowed with ethanol at 0.5 mL/min, but it is not necessary. Then the temperature in the heating jacket was raised to 37-40° C. and the pressure raised to 110-115 bars, at a rate of 3 bars/min. For 3-4 hours (up to 8) at 37-40° C. and 110 bars, until the recovery of ethanol is <1 ml/minute. CO2 was flowed through the vessel at a rate of approximately 6 mL/min measured at 10° C. After flowing the pressure was slowly released during 0.5 to several hours. The weight of the supercritical dried aerogel was approximately 2.2 kg.

Example 3. Preparing an Aerogel with App. 80% Encapsulated ZnP from Pre-Condensated TMOS 1. Solution 1: 10.5 g pre-condensated TMOS, 5.2 g MTMS and 45 g Ethanol was stirred on a magnetic stirrer in a Erlenmeyer flask for approx. 15 minutes. 30.0 g Zinc pyrithione was added during mixing. The solution was mixed for additionally 15 minutes.
2. Solution 2: 18 g Ethanol, 1.5 g Water and 300 µl of ammonia solution (concentrated) is mixed.
3. Solution 2 was added to solution 1 during mixing at full speed (1500 RPM) on the magnetic stirrer. After additionally 2-5 minutes of mixing, the white opaque solution was transferred into a bluecap bottle. After approx. 45 minutes, the gelation took place and the obtained gel was aged in ethanol, for 2-3 days at room temperature, before drying.
4. The wet gel from 3) was cut into smaller pieces and transferred under ethanol to a 5 or 10 L pressure vessel (flow reactor, equipped with heating jacket and metal frits in both ends). The gel can be flowed with ethanol at 0.5 mL/min, but it is not necessary. Then the temperature in the heating jacket was raised to 37-40° C. and the pressure raised to 110-115 bars, at a rate of 3 bars/min. For 3-4 hours (up to 8) at 37-40° C. and 110 bars, until the recovery of ethanol is <1 ml/minute. CO2 was flowed through the vessel at a rate of approximately 6 mL/min measured at 10° C. After flowing the pressure was slowly released during 0.5 to several hours. The weight of the supercritical dried aerogel was 37.5 g.

Example 3.a. Preparing an Aerogel with App. 76% Encapsulated ZnP from Pre-Condensated TEOS 1. Solution 1: 33.16 g pre-condensated TEOS (or pure TEOS) and 93 g Ethanol was stirred on a magnetic stirrer in an Erlenmeyer flask for approx. 15 minutes. 40.25 g Zinc pyrithione was added during mixing. The solution was mixed for additionally 15 minutes.
2. Solution 2: 36 g Ethanol, 74 g Water and 2.8 g of catalyst base (Weigh 1.852 g NH4F and add it to 100 mL of water. Add 20.50 g (22.78 mL) ammonium hydroxide solution. Store this in a bottle so you can reuse it later. This is the "catalyst base" mixed).
3. Solution 2 was added to solution 1 during mixing at full speed on the magnetic stirrer. After additionally 8-15 minutes of mixing, the white opaque solution was transferred into a bluecap bottle. After approx. 15 minutes, the gelation took place and the obtained gel was aged in ethanol, for approx. 3-5 days, before drying.
4. The wet gel from 3) was cut into smaller pieces and transferred under ethanol to a ½ L pressure vessel (½ L flow reactor, equipped with heating jacket and metal frits in both ends). The gel can be flowed with ½ L of ethanol at 0.5 mL/min, but it is not necessary. Then the temperature in the heating jacket was raised to 37-40° C. and the pressure raised to 100 bars, at a rate of 3 bars/min. For approx. 4 hours at 40° C. and 100 bars, 2% kg of CO2 was flowed through the vessel at a rate of approximately 6 mL/min. After flowing the pressure was slowly released during 1 hour. The weight of the supercritical dried aerogel is approx. 53 g.

Example 3.b. Preparing an Aerogel with App. 76% Encapsulated ZnP from Pre-Condensated TEOS and MTMS 1. Solution 1: 21.3 g pre-condensated TEOS (or pure TEOS), 11.86 g MTMS and 93 g Ethanol was stirred on a magnetic stirrer in a Erlenmeyer flask for approx. 15 minutes. 40.25 g Zinc pyrithione was added during mixing. The solution was mixed for additionally 15 minutes.
2. Solution 2: 36 g Ethanol, 74 g Water and 2.84 g of catalyst base (Weigh 1.852 g NH4F and add it to 100 mL of water. Add 20.50 g (22.78 mL) ammonium hydroxide solution. Store this in a bottle so you can reuse it later. This is the "catalyst base") and mix.
3. Solution 2 was added to solution 1 during mixing at full speed on the magnetic stirrer. After additionally 8-15 minutes of mixing, the white opaque solution was transferred into a bluecap bottle. After approx. 104 minutes, the gelation had taken place and the obtained gel was aged in ethanol, for approx. 3-5 days, before drying.
4. The wet gel from 3) was cut into smaller pieces and transferred under ethanol to a ½ L pressure vessel (½ L flow reactor, equipped with heating jacket and metal frits in both ends). The gel can be flowed with ½ L of ethanol at 0.5 mL/min, but it is not necessary. Then the temperature in the heating jacket was raised to 37-40° C. and the pressure raised to 100 bars, at a rate of 3 bars/min. For approx. 4 hours at 37-40° C. and 100 bars, 2% kg of CO2 was flowed through the vessel at a rate of approximately 6 mL/min. After flowing the pressure was slowly released during 1 hour. The weight of the supercritical dried aerogel is approx. 53 g.

Example 4. Preparing an Aerogel with Encapsulated Diuron from Pre-Condensated TMOS 1. Solution 1: A mixture of 10.5 g pre-condensated TMOS, 5.2 g MTMS and 45 g Ethanol is stirred on a magnetic stirrer in an Erlenmeyer flask for 15 minutes. 12 g Diuron was added during mixing. The solution was mixed for additionally 15 minutes.
2. Solution 2: 18 g Ethanol, 1.5 g Water and 0.8 g of ammonia solution is mixed.
3. Solution 2 was added to solution 1 during mixing at full speed (1500 RPM) on the magnetic stirrer. After additionally 2-5 minutes of mixing, the white opaque solution was transferred to a bluecap bottle. After approx. ½ hour, the gelation took place and the obtained gel was aged in ethanol, for 2-3 days at room temperature, at room temperature, before drying.
4. The wet gel from 3) was cut into smaller pieces and transferred to a ½ L pressure vessel. Then the temperature in the heating jacket was raised to 37-40° C. and the pressure raised to 100 bars, at a rate of 3 bars/min. For approx. 4 hours at 37-40° C. and 100 bars, 2% kg of CO2 was flowed through the vessel at a rate of approximately 6 mL/min measured at 10° C. After flowing the pressure was slowly released during 1 hour. The weight of a supercritical dried aerogel is app. 20 g, which correlates to approx. 60 wt % of Diuron.

Example 4.b. Preparing an Aerogel with Encapsulated Diuron from Pre-Condensated TEOS 1. Solution 1: A mixture of 10.72 g pre-condensated TEOS, 6.09 g MTMS and 28.45 g Ethanol is stirred on a magnetic stirrer in an Erlenmeyer flask for 15 minutes. 12.29 g Diuron was added during mixing. The solution was mixed for additionally 15 minutes.
2. Solution 2: 28.45 g Ethanol, 22.95 g Water and 1.19 g of stock solution base (Weigh 1.852 g NH4F and add it to 100 mL of water. Add 20.50 g (22.78 mL) ammonium hydroxide solution. Store this in a bottle so you can reuse it later. This is the "catalyst base") are mixed.
3. Solution 2 was added to solution 1 during mixing at full speed on the magnetic stirrer. After approx. 40 minutes, the gelation took place and the obtained gel was aged in ethanol, for approx. 3 days drying.
4. Samples of wet gel from 3) was frozen at −80° C. and −18° C. and freeze dried. Both samples have been analyzed by Mercury Intrusion porosimetry.

The remaining wet gel from 3) was cut into smaller pieces and transferred under ethanol to a ½ L pressure vessel (½ L flow reactor, equipped with heating jacket and metal frits in both ends). Then the temperature in the heating jacket was raised to 37-40° C. and the pressure raised to 100 bars, at a rate of 3 bars/min. For approx. 4 hours at 37-40° C. and 100 bars, 2% kg of CO2 was flowed through the vessel at a rate of approximately 6 mL/min measured at 10° C. After flowing the pressure was slowly released during 1 hour. The weight of the supercritical dried aerogel is app. 35 g, which correlates to approx. 65 wt % of Diuron.

Example 5. Preparing an Aerogel with App. 75% Encapsulated IPBC from Precondensated TMOS or TEOS 1. Solution 1: A mixture of 14 g precondensated TMOS or TEOS, 7 g MTMS and 60 g Ethanol was stirred on a magnetic stirrer in an Erlenmeyer flask for 15 minutes. 35.0 g IPBC (3-iod-2-propynylbutylcarbamate) was added during mixing. The solution was mixed for additionally 15 minutes.
2. Solution 2: 24 g Ethanol, 2 g Water and 1.9 ml of ammonia solution (concentrated) is mixed.
3. Solution 2 is added dropwise to solution 1 during mixing at full speed (1500 RPM) on the magnetic stirrer. After additionally 2 minutes of mixing, the white opaque solution is transferred into a bluecap bottle. After approx. 180 minutes, the gelation takes place and the obtained gel is aged in ethanol, for 2-3 days at room temperature, before drying. The amount of ammonia solution can be reduced to 1 g to prolong the gelling time.
4. The wet gel from 3) is cut into smaller pieces and transferred under ethanol (or a higher alcohol) to a ½ L pressure vessel (% L flow reactor, equipped with heating jacket and metal frits in both ends). There the gel was flowed with %2 L of ethanol at 0.5 mL/min. Then the temperature in the heating jacket is raised to 37-40° C. and the pressure raised to 110 bars, at a rate of 3 bars/min. For 4 hours at 40° C. and 110 bars, 2% kg of CO2 is flowed through the vessel at a rate of approximately 6 mL/min measured at 10° C. After flowing the pressure is slowly released during 0.5- several hours. Yield of supercritical dried aerogel: approximately 47 g, containing app 75 w/w % IPBC.

Example 5.a. Preparing an Aerogel with App. 75% Encapsulated IPBC from TMOS and/or TEOS 1. Solution 1: 3.1 g Ethanol, 60.9 g Water and 1.9 ml, 2 g dispersion agent (Tego dispers 740W) and 1 g of anti-foaming agent (Foamex 1488) was mixed. Add 15.97 g of Iodocarb (3-iod-2-propynylbutylcarbamate) and stir for 5 minutes.
2. Solution 2: A mixture of 14 g TMOS and 14 g of TEOS was stirred in a container on a magnetic stirrer for 5 minutes.
3. Solution 2 is added to solution 1 mixing at full speed on the magnetic stirrer. After additionally 5 minutes of mixing. Add catalyst solution and mix until the gelation takes place. The gel is aged for 2-3 days in the fridge before drying.
4. Freeze-drying is preferred due to the amount of water. Theoretical w/w % of biocide in gel is approx. 56 w/w %. The total amount of gel is estimated to 29 g.

Example 5.b. Preparing an Aerogel with Encapsulated Terbutryn from TMOS

1. Solution 1: 50 g Water, 3 g Ethanol, 2.52 g dispersion agent (Tego dispers 740W) and 1 g of anti-foaming agent was mixed. Add 15 g of Terbutryn and stir for 5 minutes.
2. Solution 2: A mixture of 20 g of TMOS (or precondensated), 10 g MTMS was stirred in another container on a magnetic stirrer for 5 minutes.
3. Solution 2 is added to solution 1 during mixing at full speed on the magnetic stirrer. After additionally 5 minutes of mixing, 0.4 g of catalyst (NH4OH) is poured into the mixture. After the gelation the obtained gel is aged, for approx. 3 days before drying. The amount of catalyst can be reduced to prolong the gelling time.
4. Freeze-drying is preferred due to the amount of water. Theoretical w/w % of biocide in gel is approx. 56 w/w %. The total amount of gel is estimated to 27 g.

Example 6. Preparing an Aerogel with App. 75% Encapsulated DCOIT from Pre-Condensated TMOS 1. Solution 1: A mixture of 17.5 g precondensated TMOS, 3.2 g MTMS (or DEDMS) and 60 g Ethanol was stirred on a magnetic stirrer in an Erlenmeyer flask for 15 minutes. 30.0 g DCOIT (4,5-Dichloro-2-octyl-4-isothiazolin-3-one) was added during mixing. The solution was mixed for additionally 15 minutes.
2. Solution 2: 24 g Ethanol, 2 g Water and 9 ml of HCl is mixed.
3. Solution 2 is added to solution 1 during mixing at full speed on the magnetic stirrer. After additionally 2-5 minutes of mixing, the white opaque solution is transferred into a bluecap bottle. After the gelation has taken place the obtained gel is aged in ethanol for 2-3 days at room temperature, before drying.
4. The wet gel from 3) is cut into smaller pieces and transferred under ethanol to a %2 L pressure vessel (% L flow reactor, equipped with heating jacket and metal frits in both ends). There the gel is flowed with %2 L of ethanol at 0.5 mL/min. Then the temperature in the heating jacket is raised to 37-40° C. and the pressure raised to 90 bars, at a rate of 3 bars/min. For 4 hours at 35° C. and 90 bars, 2% kg of CO2 is flowed through the vessel at a rate of approximately 6 mL/min measured at 10° C. After flowing the pressure is slowly released during 0.5-several hours. Yield of supercritically dried aerogel: approximately 40 g, containing app 75 w/w % DCOIT.

Example 7. Preparing an Aerogel with Encapsulated Tolylfluanid from Pre-Condensated TMOS/TEOS 1. Solution 1: 50 g Water, 3 g Ethanol, 2.52 g dispersion agent (Tego dispers 740W) and 1 g of anti-foaming agent was mixed. Add 15 g of Tolylfluanid stir for 5 minutes.
2. Solution 2: A mixture of 20 g of TMOS (or precondensated), 10 g MTMS was stirred in another container on a magnetic stirrer for 5 minutes.
3. Solution 2 is added to solution 1 during mixing at full speed on the magnetic stirrer. After additionally 5 minutes of mixing, 0.4 g of catalyst (NH4OH) is poured into the mixture. After the gelation the obtained gel is aged for approx. 3 days before drying. The amount of catalyst can be reduced to prolong the gelling time.

Freeze-drying is preferred due to the amount of water. Theoretical w/w % of biocide in gel is approx. 56 w/w %. The total amount of gel is estimated to 27 g.

Example 8. Mercury Porosimetry Measurements

Background:

In mercury intrusion porosimetry, a dry sample of loaded aerogel is placed into a container, which is then evacuated to remove contaminant gases and vapors (usually water). While the container is still evacuated, mercury is allowed to fill the container. This creates a system that consists of a solid, a non-wetting liquid (mercury), and mercury vapor. In the next step pressure is increased toward ambient. This causes mercury to enter the larger openings in the aerogel sample, and the amount that does so is reflected in a volume change. The sample container is then placed in a pressure vessel and attached to a pressurization system that allows the pressure on the system to be increased up to approximately 60,000 psi (414 MPa); a typical maximum value for commercial instruments. This will force mercury into pores as small as approximately 0.003 µm in diameter. Regardless of the pore geometry and the model employed to quantify it, the volume of mercury forced into the interconnected pores of the aerogel sample increases as pressure increases. Mercury intrusion is not well-suited for analyzing the pore structure of empty aerogels, as their solid frame may collapse from the high compressive force.

Mercury intrusion porosimetry gives information about many aspects of the aerogel pore structure, notably the porosity (%), which is defined as the volume of the void (empty) space of the sample divided by the total volume of the sample. Also the intrusion volume (ml/g), which is a measure of the interconnected porous part of the sample.

Example 8.a. Measurements of ZnP-Containing Aerogels

In the present experiment, 5 different aerogel samples (1A, 1B, 1C, 2A and 2B), all containing 75% ZnP, were tested by mercury intrusion porosimetry for various pore-related parameters. Samples 1A, 1B and 1C were prepared with normal silicates under different process conditions, and samples 2A and 2B with pre-condensated TMOS.

It was found that both the bulk density and the intrusion volume was highly de-scriptive when defining the differences between aerogels produced using either normal tetraalkoxysilanes or pre-condensated silicates, see FIG. 7.

From the performed experiments in Example 8a it can be concluded that ZnP-containing aerogels prepared with pre-condensated TMOS have a significantly lower bulk density and a significantly higher intrusion volume than similar aerogels produced from normal silicates. On the other hand, the porosity and oil number for the two types of gel do not display a similar trend.

Example 8.b. Measurements of Aerogels Containing Other Biocides

For all samples the content of encapsulated biocide was evaluated by thermogravimetric (TGA) measurements. For ZnP and CuP there was a good agreement between the amount biocide planned to be entrapped in the aerogel and the amount actually present in the aerogel when measured by TGA (77% and 76% respectively vs. 75% planned for).

Methods Characterization Aerogels
Gel Properties
Mercury Intrusion Analysis

High-pressure mercury (Hg) intrusion analysis was performed in an Autopore V equipment (early measurements: Autopore IV model 9520 or similar) from Micromeritics. The samples were measured in a pressure range from 0.5 psia to 30000 psia, equivalent to a pore size scan between 338 µm to 6.6 nm.

1. All samples were loaded into a penetrometer specifically designed to analyse powder samples (i.e. volume 5 ml, capillary stem volume of 1.13 ml). The amount of sample poured into the penetrometer, was enough to attain a volume stem usage of 20%, which ensures a better resolution of the data.
2. Prior to analysis, the penetrometer with sample was submitted to a degassing treatment, under vacuum, to a set-point limit below 50 µmHg. The samples were then analysed in two different operation modes: low-pressure (up to 40 psia, 17 number of points) and high-pressure (up to 30000 psia, 32 number of points).
3. Once low-pressure analysis is done the penetrometer containing Hg and packed-bed, is weighed again, being the value used as software input to determine the bulk density (i.e. interparticle porosity).
4. Then, the penetrometer is placed into a high-pressure port and while going to higher pressures the intraparticle porosity was determined, being related with apparent density.
5. The pore diameter was calculated using Washburn equation, assuming a contact angle (6) of 130 degrees and a value of mercury surface tension ($\gamma$) of 0.48 j/m$^2$. Finally, the summary of the data is displayed by the equipment software.

Oil Number

The oil absorption value has been determined for the produced gels, using the method described in DIN 53155/ISO 587/5. The oil absorption value is the quantity of refined linseed oil required to completely wet a definite weight of pigment to form a stiff paste when mechanically mixed (i.e. the number of grammes of oil that it takes to just saturate 100 g of pigment). The value should be regarded as qualitative and has meaning in relation to a preliminary mixer operation. The value is also used to calculate the critical pigment volume concentration. In this case the measured value will be a combination of the wetting of the surface area as well as the penetration of the porous structure.

Water Absorption

A small sample approx. 0.2 grams is weighed in a small petri dish and placed in a desiccator with blue silica gel in the bottom and placed in a climate room.

1. The weight loss of the sample is recorded until stable weight is obtained normally after 4 to 6 days and the dry weight is recorded.
2. The dry sample is placed in a desiccator with tap water in the bottom (approx. 86% RH). The gained weight of the sample is recorded until stable weight is obtained normally after 4 to 6 days.

The weight gained is calculated. This can be expressed as Pore volume=(weight of saturated sample−weight of dried sample)/density of water.

The test is performed in duplo at 23±2° C.

Bet

By BET (Brunauer, Emmett and Teller) analysis, the specific surface area of a sample is measured, including the pore size distribution. The specific surface area of a powder is determined by physical adsorption of a gas on the surface of the solid and by calculating the amount of adsorbate gas corresponding to a monomolecular layer on the surface. Physical adsorption results from relatively weak forces (van der Waals forces) between the adsorbate gas molecules and the adsorbent surface area of the test powder. The determination is usually carried out at the temperature of liquid nitrogen. The amount of gas adsorbed can be measured by a volumetric or continuous flow procedure. Note that this method assumes that gas communicates between the pores and the surrounding volume. In practice, this means that the pores must not be closed cavities. BET equipment used for this study: Micromeritics Gemini series with Micromeritics VacPrep or equivalent drying station. Pore volumes $>4*10^{-6}$ cm$^3$/g can be measured.

Thermogravimetric (TGA) Measurements

The samples have been analysed in a Mettler Toledo TGA 40. The samples, typically 10-25 mg, are placed in a crucible and weighed. The temperature is raised from room temperature to 800° C. at 10° C./minute. The weight loss is registered. Solvents disappear typically before 250° C., and in connection with gel production typically before 150° C. Other organic material incl. polymers disappear before 450° C. At 800° C. normally only the inorganic material is left. A function control of the equipment is made with Indium to make sure that the temperature profile is within the calibration of the equipment. The weight loss is evaluated using the software program STARe version 7.01.

Thermal Conductivity Measurements

Test Methods

According to ISO 22007-1 (2008): General principles—line source method According to ASTM D 5930-0: Test Method for Thermal Conductivity of Plastics by Means of a Transient Line-Source Technique. Measurements are based on a variation of the hot-wire method (needle-probe method) which is a transient technique that measures temperature changes at a known distance from a linear heat source embedded in the test sample Equipment ISOMET 2114 Heat transfer analyzer—equipped with needle probe (0.015-0.050 [W/m K]). The ISOMET 2114 is a portable hand-held measuring instrument for direct measurement of heat transfer properties of a wide range of isotropic materials including cellular insulating materials, plastics, liquids, powder-like materials, and soils.

Test Conditions

Mean measurement temperature at approx. 25° C.

Measurements were carried out in series of 6 measurements with a 10-minute pause between each measurement. Test results are shown in FIG. 10.

Determination of Hiding Power (Opacity) in Paints and Varnishes

Standard: ISO 6504-3:2019(EN) Determination of hiding power—Part 3: Method C (black and white charts) Determination of contrast ratio of light-coloured paints at a fixed spreading rate (ISO 6504-3:2006)

Equipment:

Color-guide 45/0; BYK Gardner

Applicator with variable gabs

Data for black and white charts: 139×254 mm—Form 2A—Opacity; The Leneta Company

Method (Hiding power):

Each sample of the loaded aerogels of the present invention was ground in a binder solution and applied in two different layer thicknesses. The concentration of loaded aerogels to binder was kept constant when comparing different loaded aerogels. After drying, the hiding power was calculated for each coated chart over Black (B) and White (W).

The sample is applied on weighed black/white carts in different film layer thicknesses at 23±2° C. and a relative humidity of 50±5%. After drying for at least 16 h, measurement of the tristimulus values Y10 can be done.

The tristimulus values (three values that together are used to describe a colour and are the amounts of three reference colours that can be mixed to give the same visual sensation as the colour considered) of each coated chart are measured at three positions over both black and white areas of each chart and the average tristimulus values 910b and ŷ10w for the low and high coatings respectively. Then the hiding power is calculated for each coated chart for at given film thickness and volume of dry matter concentration. The final 910 value is then calculated as ŷ10=ŷb/ŷw Test Results The following three paint formulas were prepared:

| Formula | 1 | 2 | 3 |
|---|---|---|---|
| Zn pyrithione gel | 17.00 | 0.00 | 0.00 |
| Empy gel | 0.00 | 5.10 | 0.00 |
| Cu pyrithione | 0.00 | 0.00 | 10.00 |
| Foral AX-E | 41.50 | 47.45 | 45.00 |
| Xylene | 41.50 | 47.45 | 45.00 |
| | 100.00 | 100.00 | 100.00 |

Subsequently the paints were tested for hiding power as mentioned above. Test results are shown in the table below:

| Paint formula | Gel type/% | Dry film thickness | Measurement 1 Opacity % | Measurement 2 Opacity % | Average Opacity % |
|---|---|---|---|---|---|
| 1 | Zn pyrithione 17% gel | 120 μm | 17.85 | 16.85 | 17 |
|   | Zn pyrithione 17% gel | 240 μm | 54.40 | 53.9 | 54 |
| 2 | Empty gel Paste 4.25% | 150 μm | 4.77 | 4.77 | 5 |
|   | Empty gel Paste 4.25% | 240 μm | 4.80 | 4.81 | 5 |
| 3 | Cu pyrithione 10% gel | 120 μm | 65.36 | 69.82 | 68 |
|   | Cu pyrithione 10% gel | 150 μm | 84.68 | 85.34 | 85 |

As can be seen from the above test results, all paints containing the aerogels of the present invention had hiding power, especially as regards the loaded gels.

Anti-Fouling Paint Composition

The water absorption of the paint film is a critical parameter connected to leaching layer, leaching of the active compound, erosion rate and thus anti-fouling properties. Water absorption is influenced by the choice of pigmentation, the chosen gel and the amount of gel. The aerogels are very porous and an equilibrium between the different components has to be achieved before valid measurements can be performed. It has been shown that in a paint composition the binder system penetrates the aerogel, which reduces the water absorption until the equilibrium between the components is attained, and also assures that the aerogel particles are securely fastened in the dried paint layer and not washed out over time by exposure to water. In sealant compositions a similar mechanism is conceivably operable. It is assumed that gels with high intrusion volume values (as measured by mercury poromesitry) can be penetrated easier by the binder system.

The invention claimed is:

1. Method of treating surfaces exposed to humid air comprising applying to a surface exposed to air having a relative humidity of at least about 65% a paint or sealant comprising an anti-fouling additive which comprises
   a. an inorganic, silica-containing aerogel comprising:
   b. a porous gel lattice, and
   c. optionally an alkoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
   d. one or more biocidal or biorepellant compounds entrapped in said aerogel, wherein said silica-containing aerogel comprises at least 55% by weight of the one or more biocidal or biorepellant compounds, and wherein the entrapment of said one or more biocidal or biorepellant compounds takes place during formation of the aerogel, and wherein the one or more biocidal or biorepellant compounds is selected from the group consisting of Zineb, Diuron, Tolylfluanid, Zinc pyrithione, 3-iodo-2-propynylbutylcarbamate (IPBC), and 2-tert butylamino-4-ethylamino-6-methylthio-1,3,5-triazine (Terbutryn) and mixtures thereof, and wherein the aerogel has a bulk density value of at most 0.5 gr/ml when said aerogel comprises at most 75% by weight Zn pyrithione, and wherein the antifouling additive has a thermal conductivity between 0.01-0.05 W/m*K.

2. Method according to claim 1 comprising at least 60% by weight of said one or more biocidal or biorepellant compounds.

3. Method according to claim 1, wherein the biocidal or biorepellant compound is selected from Tolylfluanid, Zinc pyrithione, Diuron, 3-iodo-2-propynylbutylcarbamate (IPBC), 2-tert-butylamino-4-ethylamino-6-methylthio-1,3,5-triazine (Terbutryn), or mixtures thereof.

4. Method according to claim 1, wherein the biocidal or biorepellant compound is Zineb or Zinc Pyrithione.

5. Method according to claim 1 comprising at least 75% by weight of said one or more biocidal or biorepellant compounds.

6. Method according to claim 1 comprising at least 80% by weight of said one or more biocidal or biorepellant compounds.

7. Method according to claim 1 comprising at least 85% by weight of said one or more biocidal or biorepellant compounds.

8. Antifouling coating composition for protecting surfaces exposed to humid air, comprising an antifouling additive comprising:
   a. an inorganic, silica-containing aerogel comprising:
   b. a porous gel lattice, and
   c. optionally an alkoxide comprising Sc, Ti, V, Cr, Mn, Fe, Co, Y, Zr, Nb, Ru, Hf, Ta, W, Re, Al, Ge, In, La, Pr, Nd, Sm, Eu, Gd, Tb, Dy, Ho, Er, Tm, Yb or Lu, and
   d. one or more biocidal or biorepellant compounds entrapped in said aerogel, wherein said silica-containing aerogel comprises at least 55% by weight of the one or more biocidal or biorepellant compounds, and wherein the entrapment of said one or more biocidal or biorepellant compounds takes place during formation of the aerogel, and wherein the one or more biocidal or biorepellant compounds is selected from the group consisting of Diuron, Zineb, Tolylfluanid, Zinc pyrithione, 3-iodo-2-propynylbutylcarbamate (IPBC) and 2-tert butylamino-4-ethylamino-6-methylthio-1,3,5-triazine (Terbutryn), and wherein the aerogel has a bulk density value of at most 0.5 gr/ml when said aerogel comprises at most 75% by weight Zn pyrithione, and wherein said antifouling additive has a thermal conductivity of is between 0.01-0.05 W/m*K.

9. Antifouling coating composition according to claim 8 wherein the biocidal or biorepellant compound is Zineb or Zinc Pyrithione.

* * * * *